United States Patent
Nakatsugawa

(10) Patent No.: US 10,965,542 B2
(45) Date of Patent: Mar. 30, 2021

(54) MANAGEMENT APPARATUS, MANAGEMENT METHOD AND NON-TRANSITORY COMPUTER-READABLE STORAGE MEDIUM FOR STORING MANAGEMENT PROGRAM

(71) Applicant: FUJITSU LIMITED, Kawasaki (JP)

(72) Inventor: Keiichi Nakatsugawa, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/991,278

(22) Filed: May 29, 2018

(65) Prior Publication Data

US 2018/0351823 A1 Dec. 6, 2018

(30) Foreign Application Priority Data

May 31, 2017 (JP) .............................. JP2017-108724

(51) Int. Cl.
| | |
|---|---|
| *H04L 12/24* | (2006.01) |
| *G06N 3/02* | (2006.01) |
| *H04L 12/26* | (2006.01) |
| *G06N 3/08* | (2006.01) |

(52) U.S. Cl.
CPC ............. *H04L 41/147* (2013.01); *G06N 3/02* (2013.01); *G06N 3/084* (2013.01); *H04L 41/145* (2013.01); *H04L 41/16* (2013.01); *H04L 43/0876* (2013.01); *H04L 43/16* (2013.01)

(58) Field of Classification Search
CPC ..... H04L 41/147; H04L 41/145; H04L 41/16; H04L 43/0876; H04L 43/16; G06N 3/02; G06N 3/084
See application file for complete search history.

(56) References Cited

U.S. PATENT DOCUMENTS

| | | | | |
|---|---|---|---|---|
| 8,995,249 B1* | 3/2015 | Roy | ...................... | H04L 41/147 370/216 |
| 2003/0009580 A1* | 1/2003 | Chen | ..................... | H04W 72/02 709/231 |
| 2005/0169185 A1* | 8/2005 | Qiu | ........................ | H04L 41/145 370/241 |

(Continued)

FOREIGN PATENT DOCUMENTS

| | | |
|---|---|---|
| JP | 07-64944 | 3/1995 |
| JP | 2000-49863 | 2/2000 |

(Continued)

*Primary Examiner* — John A Follansbee
*Assistant Examiner* — Raqiul A Choudhury
(74) *Attorney, Agent, or Firm* — Fujitsu Patent Center

(57) ABSTRACT

A management method includes executing an acquisition process, estimation process, comparison process, and output process. The acquisition process acquires; an actual measurement value of the first traffic, and accesses a memory storing a model for estimation of second traffic in accordance with the first traffic. The estimation process includes obtaining, for each of the plurality of communication apparatuses, an estimation value of the second traffic by inputting the actual measurement value of the first traffic per unit time into the model. The comparison process includes comparing, for each of the communication apparatuses, an estimation value of the second traffic and a given value with each other. The output process includes outputting an alert in accordance with a result of the comparison process.

7 Claims, 29 Drawing Sheets

(56) References Cited

U.S. PATENT DOCUMENTS

| | | | | |
|---|---|---|---|---|
| 2014/0153396 A1* | 6/2014 | Gopalan | ............... | H04L 41/142 |
| | | | | 370/235 |
| 2015/0200856 A1* | 7/2015 | Hu | ...................... | H04L 43/0894 |
| | | | | 370/236 |
| 2016/0099855 A1* | 4/2016 | Mladenov | ........... | H04L 43/0888 |
| | | | | 709/224 |
| 2016/0191194 A1* | 6/2016 | Wood | .................. | H04J 14/0286 |
| | | | | 398/58 |
| 2016/0352765 A1* | 12/2016 | Mermoud | ........... | H04L 63/1458 |
| 2017/0054641 A1* | 2/2017 | Anerousis | ............. | H04W 24/08 |
| 2017/0353873 A1* | 12/2017 | Aksela | ................. | H04W 24/02 |
| 2018/0150758 A1* | 5/2018 | Niininen | ................. | H04L 41/16 |
| 2018/0295063 A1* | 10/2018 | Flores | ................. | H04L 61/1511 |
| 2018/0367565 A1* | 12/2018 | Wang | ................. | H04L 63/1458 |

FOREIGN PATENT DOCUMENTS

| | | | | |
|---|---|---|---|---|
| JP | 2004-23114 | 1/2004 | | |
| JP | 2007-221699 | 8/2007 | | |
| WO | WO-9624210 A2 * | 8/1996 | ............. | H04L 43/00 |

\* cited by examiner

FIG. 15
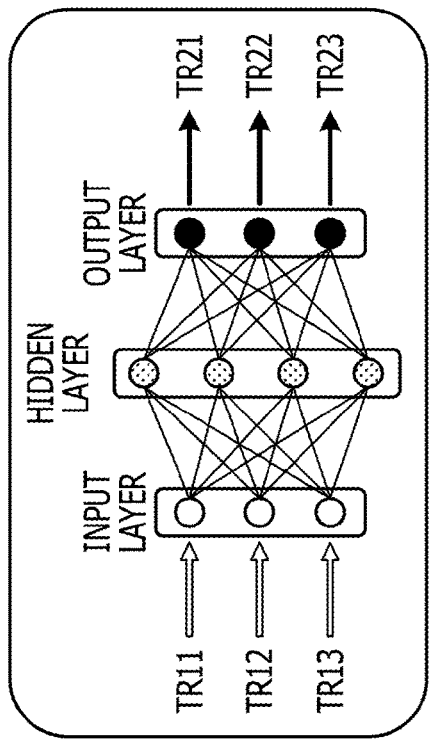
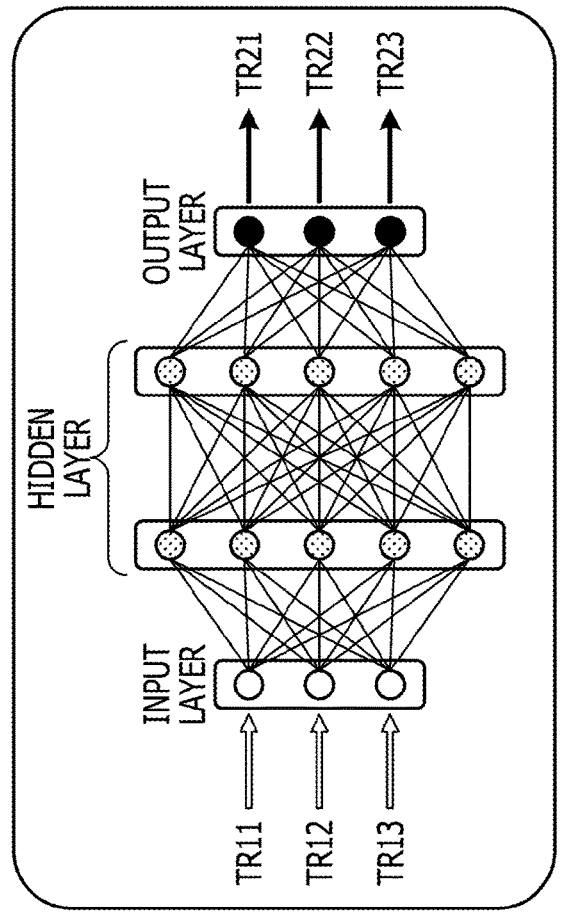
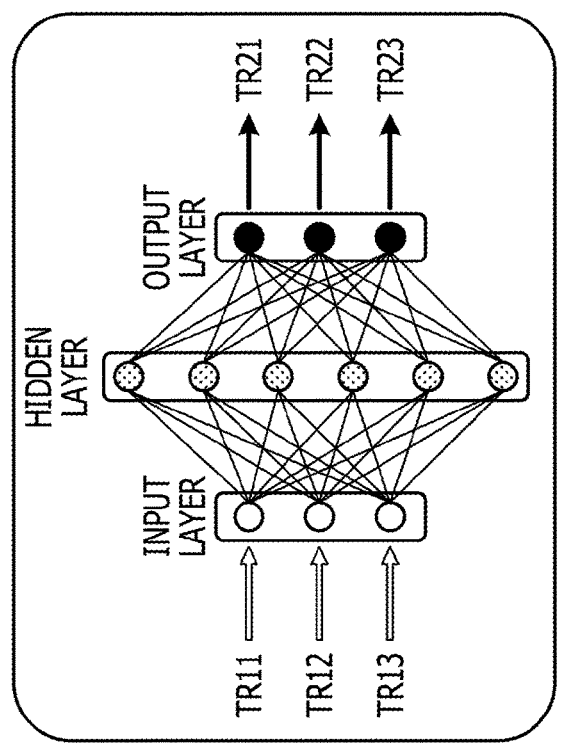

MANAGEMENT APPARATUS, MANAGEMENT METHOD AND NON-TRANSITORY COMPUTER-READABLE STORAGE MEDIUM FOR STORING MANAGEMENT PROGRAM

CROSS-REFERENCE TO RELATED APPLICATION

This application is based upon and claims the benefit of priority of the prior Japanese Patent Application No. 2017-108724, filed on May 31, 2017, the entire contents of which are incorporated herein by reference.

FIELD

The embodiment discussed herein relates to a management apparatus, a management method and a non-transitory computer-readable storage medium for storing a management program.

BACKGROUND

Traffic that flows through a communication network is diversifying in terms of both the quantity and the quality. For example, in addition to business traffic by coupling between companies' bases and so forth, non-user-derived traffic and so forth by cloud services, collection and analysis of big data, and internet of things (IoT) are increasing. Further, also a communication network itself is increased in scale and is complicated in that it includes many layers and passes through a plurality of domains of different management entities or the like. Therefore, also operation management of a communication network is increasing in difficulty.

Monitoring of traffic that flows through a communication network is carried out by such a method that, as an example, traffic of a transmission data amount, a reception data amount and so forth per unit time period at a transmission port or a reception port of a communication apparatus is monitored periodically and, in the case where the traffic reaches a given threshold value, a notification of an analog is issued to a network operator. This threshold value is set, as an example, based on experience or the like by the network operator.

However, there is one aspect that, if a fixed threshold value is used for comparison with traffic, it is difficult to set a threshold value appropriate for traffic that varies complexly together with complication in scale or configuration of the communication network.

From this, a traffic amount prediction apparatus has been proposed in which a traffic amount and a date of the traffic are learned in an associated relationship with each other using a neural network to predict an upper limit value to the variation of the traffic amount.

Examples of the related art include Japanese Laid-open Patent Publication No. 2007-221699 and Japanese Laid-open Patent Publication No. 07-64944.

SUMMARY

According to an aspect of the invention, a management method, which is performed by a computer, includes: executing an acquisition process that includes acquiring an actual measurement value of the first traffic; accessing a memory configured to store a model for estimation of second traffic in accordance with first traffic of a network that includes a plurality of communication apparatus; and executing a comparison process that includes comparing an estimation value of the second traffic and a given value with each other, wherein the estimation value is estimated by inputting the actual measurement value of the first traffic acquired by the acquisition process to the model acquired form the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 depicts an example of change of the number of hidden layers and neurons;

DESCRIPTION OF EMBODIMENT

However, the traffic amount prediction apparatus described hereinabove merely locally analyzes traffic through a port or a link included in a network. Therefore, the traffic amount prediction apparatus described above sometimes fails to globally analyze traffic of the entire network.

According to an aspect of the present disclosure, a technology capable of globally analyzing traffic of an entire network is provided.

In the following, a management apparatus, a management method and a management program according to the present application are described with reference to the accompanying drawings. It is to be noted that working examples hereunder are not limited to the technology disclosed herein. Further, respective working examples of the embodiment may be combined suitably without contradicting contents of processing.

Working Example 1

[System Configuration]

Figure 1:
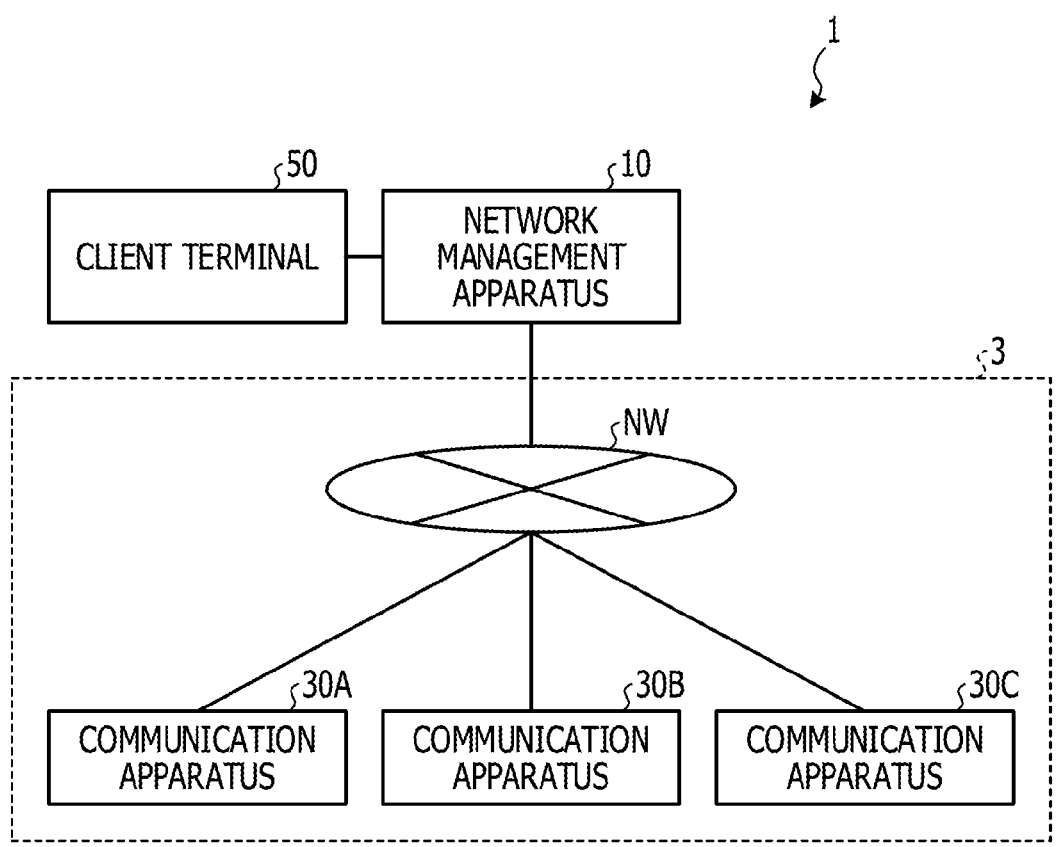
FIG. 1 depicts an example of a configuration of a network management system according to a working example 1.

FIG. 1 depicts an example of a configuration of a network management system according to a working example 1. The network management system 1 depicted in FIG. 1 provides a network management service that implements management of a network NW constructed in a monitoring target system 3 such as a communication system of a communication operator or an enterprise. The network management system 1 provides, as part of the network management service, also a traffic analysis function for globally analyzing traffic of the entire network.

As depicted in FIG. 1, the network management system 1 includes a monitoring target system 3, a network management apparatus 10 and a client terminal 50. In the monitoring target system 3, communication apparatus 30A to 30C are accommodated. In the following description, in the case where the communication apparatus 30A to 30C are collectively referred to, they are sometimes referred to as "communication apparatus 30."

While, in FIG. 1, an end host such as a terminal apparatus used by a user or a server apparatus is omitted, the monitoring target system 3 may naturally include such an end host. Further, while FIG. 1 depicts, as an example to the last, an example in which three communication apparatus 30 are accommodated in the monitoring target system 3, an arbitrary number of communication apparatus may be accommodated in the monitoring target system 3. Furthermore, while FIG. 1 depicts the network management apparatus 10 and the communication apparatus 30 as apparatus coupled to the network NW, other apparatus than those may be coupled to the network NW, and other apparatus may be coupled to the communication apparatus 30.

The network management apparatus 10 is a computer that provides the network management service described above. The network management apparatus 10 is an example of a management apparatus.

As one embodiment, the network management apparatus 10 may be incorporated as a software-defined networking (SDN) controller by installing package software or online software for implementing the network management service described above into a desired computer. Although, as an example to the last, a case is exemplified in which the traffic analysis function described above is incorporated as one function of the network management apparatus 10, the above-described traffic analysis function may not necessarily be incorporated as one function of the network management apparatus 10. For example, as an external apparatus of the network management apparatus 10, an apparatus having the traffic analysis function may be coupled to the network management apparatus 10 or the network NW. The network management apparatus 10 may execute management including monitoring, setting, control and so forth of an internet protocol virtual private network (IP-VPN), a wide area Ethernet (registered trademark) or the like as an example of the network NW. The network NW managed by the network management apparatus 10 in this manner may be a virtual network virtualized by such a technology as SDN, network function virtualization (NFV) or the like as well as a physical network.

The communication apparatus 30 are apparatus that form the network NW of the monitoring target system 3. The communication apparatus 30 include, as an example, an Ethernet (registered trademark) switch, a multi protocol label switching (MPLS) switch, an internet protocol (IP) router, an L (Layer) 4 switch, an L7 switch and so forth.

The client terminal 50 is a computer that receives provision of the network management service described hereinabove. The client terminal 50 is used, as an example, by a person concerned such as a network manager or the like who manages the network NW. Here, by provision of the above-described network management service, the client terminal 50 may not necessarily have an operating environment of Telnet or secure shell (SSH). Therefore, for the client terminal 50, an arbitrary computer that has an operating environment of a browser for universal use may be adopted. Further, the client terminal 50 may be configured as an apparatus physically same as the network management apparatus 10.

[One Aspect of Subject]

Here, one aspect of the subject is described. Operation management is sometimes performed in which a fixed threshold value is set for comparison with traffic at a certain number of links or ports of a network. According to such operation management, as one aspect, a threshold value appropriate for traffic that varies complexly together with complication in scale or configuration of the network NW may not be set, and it is difficult to appropriately monitor the behavior of traffic.

Figure 2:
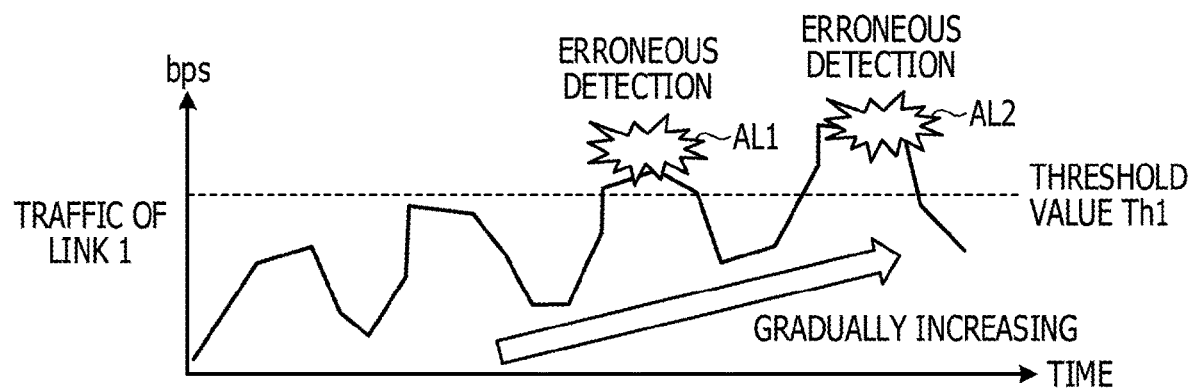
FIG. 2 depicts an example of a variation of traffic.

FIG. 2 depicts an example of a variation of traffic. In FIG. 2, a time variation of traffic at a certain link 1 in the network NW is depicted. As depicted in FIG. 2, traffic is indicated which is measured at the link 1, at which the traffic exhibits a tendency that the variation of the traffic amount, which gradually increases entirely together with lapse of time by increase of the number of users or of applications or services to be used by users, is superimposed on such a time variation that the traffic amount is great in the daytime but is small at night.

In such a case as just described, the operator will initially set a threshold value Th1 based on a peak traffic amount, and if there is no particular abnormality till a certain point of time, such a variation as a sudden increase of traffic is not detected. However, such a situation may possibly occur that, as a result of gradual increase of the traffic amount, a peak traffic amount exceeds the threshold value Th1 at a certain point of time and such a traffic variation is repetitively detected. Although such an increase of the traffic amount by a steady increase of the user number is not occurrence of abnormality, it makes a cause of occurrence of an unnecessary work such as investigation or confirmation because, since a notification of an over threshold alert AL1 or AL2 is issued similarly as in a case in which an abnormality occurs, this is regarded as erroneous detection to the operator.

Figure 3:
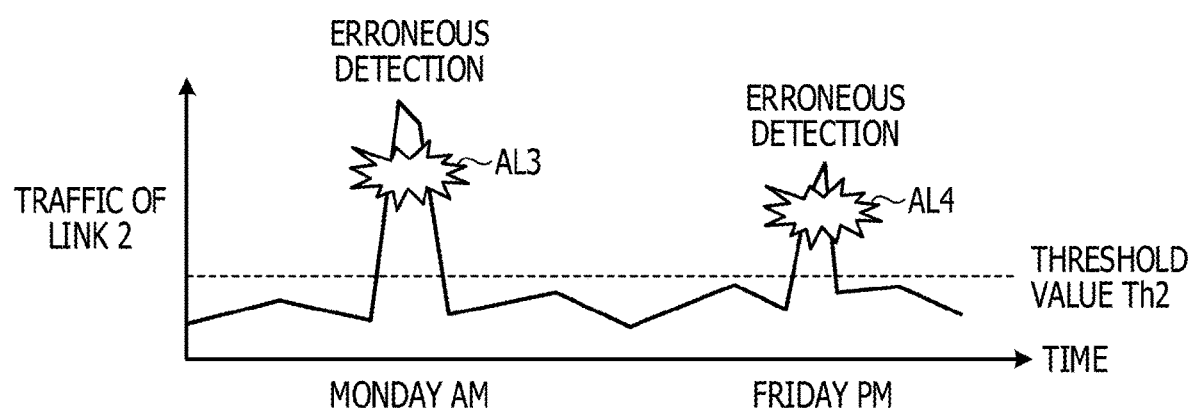
FIG. 3 depicts another example of a variation of traffic.

FIG. 3 depicts another example of a variation of traffic. In FIG. 3, a time variation of traffic at a certain link 2 in the network NW is depicted. As depicted in FIG. 3, although the traffic amount flowing steadily is small, software update on Monday morning, data backup into storage on Friday afternoon and so forth are scheduled periodically. Thus, traffic is depicted that is measured at the link 2 at which the traffic amount is inclined to temporarily increase only when update or backup is executed.

In such a case, the operator will set a threshold value Th2 based on the steady traffic amount, and normally, if there is no particular abnormality, such a variation as a sudden increase of traffic is not detected. However, such a situation may possibly occur that, as a result of temporary increase of the traffic amount upon software update or data backup, a peak traffic amount exceeds the threshold value Th2 and such a traffic variation is repetitively detected. Although such an increase of the traffic amount that may be intentionally or systematically caused is not occurrence of an abnormality, it makes a cause of occurrence of an unnecessary work such as investigation or confirmation because, since a notification of an over threshold alert AL3 or AL4 is issued similarly as in a case in which an abnormality occurs, this is regarded as erroneous detection to the operator. Further, if the threshold value Th2 is set to a high value in order to suppress such erroneous detection, in the case where an abnormality occurs, during a normal period of time except a time zone in which software update or data backup is performed, in the network NW and the traffic increases suddenly, the abnormality is less likely to be detected.

It may be recognized that, if a fixed threshold value is set for traffic that varies complexly together with complication of the scale or configuration of the network NW as depicted in FIG. 2 or 3, it is difficult to appropriately analyze the behavior of the traffic. Even if it is tried, as an example, to dynamically change the threshold value in order to solve the problem just described, since a difference in link or port makes also the tendency of the time variation of the traffic different, also the algorithm for dynamically changing the threshold value is adjusted individually.

On the background of this, a traffic amount prediction apparatus has been proposed in which a neural network is used to learn a traffic amount and the date in an associated relationship with each other to predict an upper limit value to the variation of the traffic amount.

However, the traffic amount prediction apparatus described hereinabove merely locally analyzes traffic through a port or a link included in a network. Therefore, the traffic amount prediction apparatus described above sometimes fails to globally analyze traffic of the entire network.

[One Aspect of Traffic Analysis Function]

Therefore, the network management apparatus 10 according to the present working example learns a model in which, based on first traffic inputted from the outside of the network NW to the inside of the network NW, second traffic to be outputted from the inside of the network NW to the outside of the network NW is estimated, and the estimation value and an actual measurement value of the second traffic are compared with each other.

Figure 4:
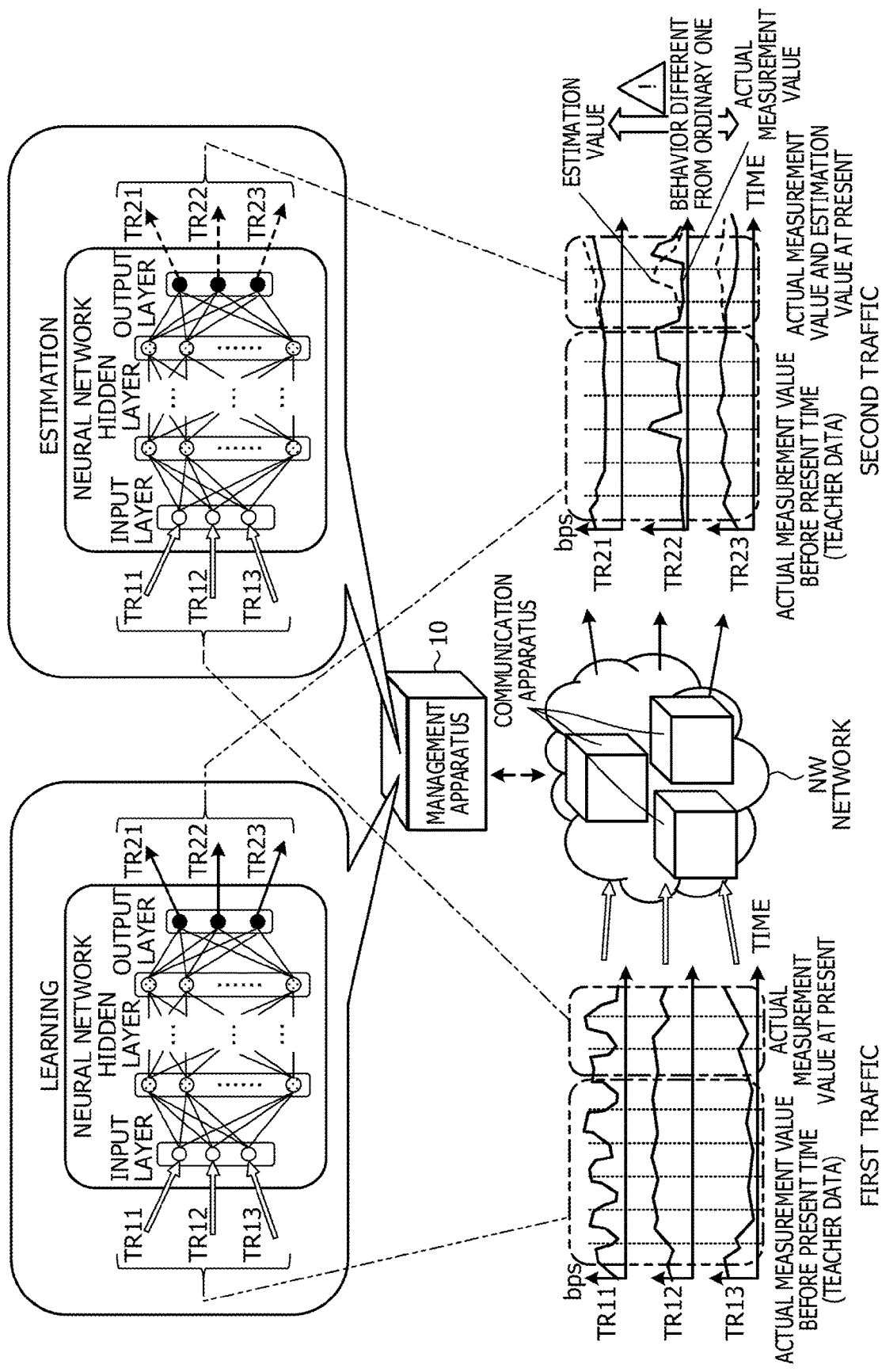
FIG. 4 depicts an example of a learning method of traffic.

FIG. 4 depicts an example of a learning method of traffic. TR11, TR12 and TR13 depicted in FIG. 4 denote a first traffic that is transmitted from some end host and inputted to the network NW and transferred in the network NW. Further, TR21, TR22 and TR23 depicted in FIG. 4 denote a second traffic that is transferred in the network NW until it is finally outputted toward some end host.

The network management apparatus 10 uses, as teacher data of depth learning, namely, deep learning, in which a neural network of a multilayer structure is used, histories of actual measurement values of the first traffics TR11 to TR13 and actual measurement values of the second traffics TR21 to TR23 at different points of time are used. In the following description, time series data of the histories of the actual measurement values of the first traffics TR11 to TR13 and the actual measurement values of the second traffics TR21 to TR23 at different points of time and the actual measurement values of the traffics are sometimes referred to as "data set."

For example, the network management apparatus 10 uses data of the first traffics TR11 to TR13 and the second traffics TR21 to TR23 at different points of time before present time as values of the input layer and the output layer of the neural network, respectively, to perform calculation such as output value calculation by forward propagation, error calculation (for example, of a square error), minimization of errors by an error back propagation method and an optimization technique of weighting coefficients (for example, a stochastic gradient descent method or Adam) and so forth. Consequently, in the case where the first traffics TR11 to TR13 are inputted in certain values to the network NW, it is learned what values are indicated by each of the second traffics TR21 to TR23 as an ordinary behavior.

For example, in the case where the stochastic gradient descent method is used, the network management apparatus 10 uses histories of actual measurement values of the first traffics TR11 to TR13 and actual measurement values of the second traffics TR21 to TR23 at a certain point of time as one sample. For example, the network management apparatus 10 estimates the second traffics TR21 to TR23 by inputting actual measurement values of the first traffics TR11, TR12 and TR13 to the input layer of a model of a neural network. The second traffics TR21 to TR23 estimated in this manner are sometimes referred to as "estimation values." Then, the network management apparatus 10 executes learning of a model that minimizes the error between the estimation values of the second traffics TR21 to TR23 to be outputted from the model and actual measurement values of the second traffics TR21 to TR23. For example, the network management apparatus 10 carries out correction of weights in accordance with correction amounts for weights determined for individual neurons of each layer in order from the output layer toward the input layer using a gradient of errors. Such learning is carried out for each sample of a data set. It is to be noted that, while a case is exemplified here in which a sample to which a label of a positive example is applied is used for learning, it is a matter of course that a sample to which a label of a negative example is applied may be used for learning.

After model learning of the neural network is executed in this manner, the network management apparatus 10 inputs the values of the first traffics TR11 to TR13 at present to the input layer of the neural network for which the optimization of weighting coefficients has been performed by the model learning, whereupon a calculation result of the second traffics TR21 to TR23 outputted from the output layer of the model is obtained. This calculation result may be regarded as estimation values of the second traffics TR21 to TR23 at present estimated based on the ordinary behavior in response to the first traffics TR11 to TR13.

Thereafter, every time estimation values of the second traffics TR21 to TR23 are obtained as a calculation result, the network management apparatus 10 compares the estimation values of the second traffics TR21 to TR23 and actual measurement values of the second traffics TR21 to TR23 at the same time measured by a communication apparatus 30 of the network NW. For example, it is decided whether or not the difference between the estimation value and the actual measurement value of the second traffic TR21, the difference between the estimation value and the actual measurement value of the second traffic TR22 and the difference between the estimation value and the actual measurement value of the second traffic TR23 are equal to or higher than a given threshold value.

Based on the result, the network management apparatus 10 may analyze whether the actual measurement values of the second traffics TR21 to TR23 have a tendency same as an ordinary tendency or have a tendency different from the ordinary tendency and detect whether or not a behavior different from an ordinary behavior occurs. For example, in the case where the difference between the estimation value and the actual measurement value is equal to or higher than the threshold value, the network management apparatus 10 compares the estimation value and the actual measurement value with each other in magnitude. Then, in the case where the actual measurement value is higher than the estimation value, the network management apparatus 10 may detect that the tendency of the traffic is different from the ordinary tendency and that the traffic indicates such abnormally many behaviors as is outside the range of a usual scope of assumption. For example, in this case, it is anticipated that there is the possibility that, a situation in which the traffic inputted from the outside to the inside of the network NW is concentrated to a terminal or a server apparatus which is coupled beyond any of the communication apparatus 30 or a situation in which a terminal apparatus transmitting traffic inputted from the outside to the inside of the network is infected by a computer virus or the like and is transmitting the traffic to many and unspecified transmission destinations occurs. On the other hand, in the case where the actual measurement value is lower than the estimation value, the network management apparatus 10 may detect that the tendency of the traffic is different from the ordinary tendency and that the traffic indicates such abnormally few behaviors as is outside the range of a usual scope of assumption. For example, in this case, it is anticipated that there is the possibility that, although the traffic inputted from the outside to the inside of the network NW has a tendency same as the ordinary tendency, the traffic transmitted from the inside to the outside of the network NW may be decreased by congestion of traffic or packet loss caused by a trouble of a communication apparatus or a line occurring in the inside of the network NW. The network management apparatus 10 may output an alert of at least one of the behaviors to the client terminal 50.

Since the network management apparatus 10 according to the present working example estimates the second traffic to be outputted from the inside of the network NW to the outside of the network NW and compares the estimation values and actual measurement values with each other in this manner, the network management apparatus 10 may globally analyze the traffic of the entire network NW. Further, since the network management apparatus 10 according to the present working example compares estimation values and actual measurement values of the second traffic with each other, the threshold value for comparing with the traffic is not fixed, and the behavior of the traffic that varies complexly together with complication of the scale or configuration of the network NW may be analyzed appropriately.

[Configuration of Network Management Apparatus 10]

Figure 5:
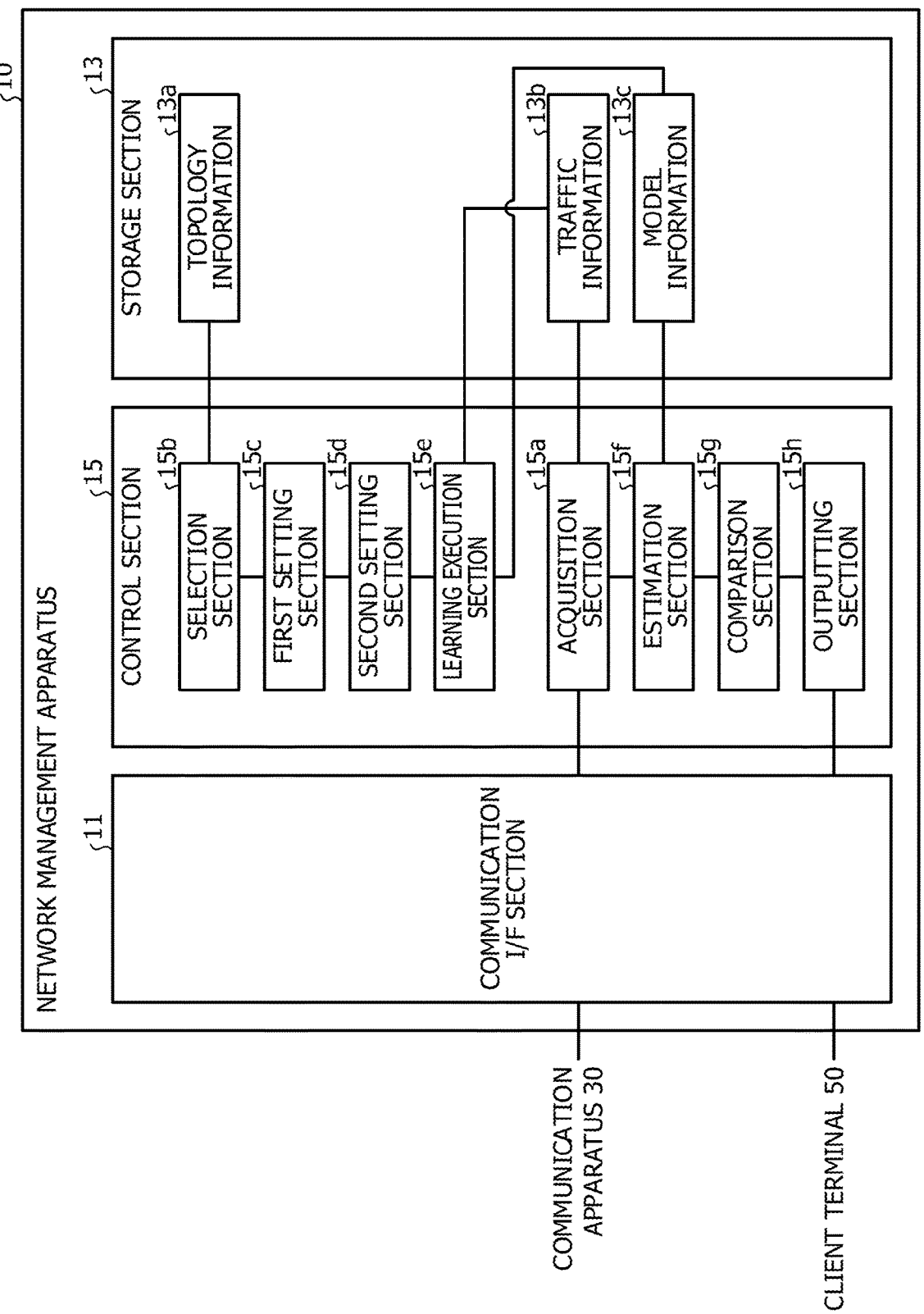
FIG. 5 depicts a functional configuration of a network management apparatus according to the working example 1.

FIG. 5 depicts a functional configuration of a network management apparatus according to the working example 1. The network management apparatus depicted in FIG. 5 may be the network management apparatus 10 depicted in FIG. 10. As depicted in FIG. 5, the network management apparatus 10 includes a communication I/F (interface) section 11, a storage section 13 and a control section 15. It is to be noted that the network management apparatus 10 may include, in addition to the functional sections depicted in FIG. 5, various functional sections a known computer includes, for example, such functional sections as various inputting devices and sound outputting devices.

The communication I/F section 11 is an interface that performs communication control with a different apparatus such as the communication apparatus 30 or the client terminal 50.

As one embodiment, for the communication I/F section 11, a network interface card such as a local area network (LAN) card may be adopted. For example, the communication I/F section 11 transmits various commands to the communication apparatus 30 or receives all or part of Config information or a management information base (MIB) stored in the communication apparatus 30 from the communication apparatus 30. Further, the communication I/F section 11 accepts various settings for the network NW from the client terminal 50 or transmits an analysis result of traffic of the network NW, for example, an alert regarding abnormality, to the client terminal 50.

The storage section 13 is a storage device that stores data to be used for various programs such as an operating system (OS) to be executed by the control section 15 and a network management program for implementing the network management service described hereinabove.

As one embodiment, the storage section 13 corresponds to an auxiliary storage apparatus in the network management apparatus 10. For example, for the storage section 13, a hard disk drive (HDD), an optical disk, or a solid state drive (SSD) may be adopted. Also a flash memory such as an erasable programmable read only memory (EPROM) corresponds to the auxiliary storage apparatus.

The storage section 13 stores, as an example of data used in a program to be executed by the control section 15, topology information 13a, traffic information 13b and model information 13c. In addition to the topology information 13a, traffic information 13b and model information 13c, also other electronic data may be stored. For example, the storage section 13 may store also user authority information and so forth by which the communication apparatus 30 or a group of the communication apparatus 30 is defined by which a setting operation or browsing is permitted for each user in order to manage authorities of users such as a network manager. It is to be noted here that description of the topology information 13a that may be stored before a model of a neural network is learned is given first, and description of the traffic information 13b and the model information 13c is given together with description of functional sections of the control section 15 by which generation of them is performed.

The topology information 13a is information regarding a coupling shape of the network NW. The topology information 13a includes device information 13a1, port information 13a2, link information 13a3 and so forth.

The device information 13a1 defines information relating to the communication apparatus 30. For example, as the device information 13a1, data may be adopted by which such items as a device identification (ID) or a device name, and an IP address are associated with each other. The "device ID" here signifies identification information for identifying each communication apparatus 30. Meanwhile, the "device name" signifies a name defined for the communication apparatus 30. Further, while the "IP address" has meaning as the words mean, the term here signifies an IP address allocated to the communication apparatus 30 having the device ID and is set by a system engineer (SE) or the like, for example, upon construction of the network NW. It is to be noted that, while, as an example of items that define the communication apparatus 30 here, a device name or an IP address is exemplified, also it is possible for the device information 13a1 to further include other items such as performance information of the communication apparatus 30.

Meanwhile, in the port information 13a2, information regarding ports the communication apparatus 30 includes is defined. For example, as the port information 13a2, data in which items of a device ID or a port ID, an interface name, a virtual LAN (VLAN) setting and so forth are associated with each other may be adopted. Although the "device ID" here signifies identification information of the communication apparatus 30 similarly to the device ID included in the device information 13a1, the term here signifies the communication apparatus 30 that include a port identified by a port ID. Further, the "port ID" signifies identification information for identifying a port the communication apparatus 30 includes. Further, the "interface name" signifies the name of an interface defined for a port. Further, the "VLAN setting" signifies a setting of a port base VLAN, a tag VLAN or the like.

Further, the link information 13a3 defines information regarding a link that couples ports of the communication apparatus 30. For example, for the link information 13a3, data in which a link ID, a device ID1, a port ID1, a device ID2, a port ID2 and so forth are associated with each other may be adopted. The "link ID" here signifies identification information for identifying a link. Further, while the "port ID1" and "port ID2" signify identification information for a port similarly to the port ID included in the port information 13a2, the terms here signify identification information of two ports to which a link identified by the link ID is coupled. Further, while the "device ID1" and "device ID2" signify identification information of the communication apparatus 30 similarly to the device ID included in the device information 13a1, the terms here signify identification information of the communication apparatus 30 that includes a port identified by the port ID1 and a port identified by the port ID2. In this manner, in the link information 13a3, a port or ports coupled already or a port or ports after linkup are registered from among the ports included in the port information 13a2.

The control section 15 is a processing section that performs entire control of the network management apparatus 10.

As one embodiment, the control section 15 may be incorporated as a hardware processor such as a central processing unit (CPU) or a micro processing unit (MPU). Although a CPU or an MPU is exemplified as an example of a processor here, an arbitrary processor may be incorporated regardless of multipurpose type or specialized type. For example, also it is possible to configure the control section 15 from a general-purpose computing on graphics process units (GPGPU) or the like. Further, the control section 15 may be implemented by hard wired logics such as an application specific integrated circuit (ASIC), or a field programmable gate array (FPGA).

The control section 15 virtually implements processing sections described below by deploying a management program for implementing the network management service described hereinabove into a working area of a random access memory (RAM) such as a dynamic random access memory (DRAM), or a static random access memory (SRAM) incorporated as a main storage apparatus not depicted.

The control section 15 includes, as depicted in FIG. 5, an acquisition section 15a, a selection section 15b, a first setting section 15c, a second setting section 15d, a learning execution section 15e, an estimation section 15f, a comparison section 15g and an outputting section 15h.

The acquisition section 15a is a processing section that acquires various kinds of information from the communication apparatus 30.

As one embodiment, the acquisition section 15a may be implemented by a simple network management protocol (SNMP) manager or the like. For example, the acquisition section 15a regularly acquire management information base (MIB) information of each communication apparatus 30 by transmitting an SNMP command at given intervals, for example, at intervals of 5 minutes to an SNMP agent that operates on the communication apparatus 30. At this time, the acquisition section 15a may acquire a traffic amount of a port designated by the SNMP agent by transmitting an SNMP command to the SNMP agent designating an object ID from which interface information is to be acquired from within the MIB information. Time series data of traffic acquired in a unit of a port in this manner, for example, a history of the traffic, is stored as the traffic information 13b into the storage section 13. This traffic information 13b is used for learning of a model of a neural network. Further, after learning of the model of the neural network, in order to perform estimation of the second traffic, the second traffic acquired by the acquisition section 15a is inputted to the estimation section 15f.

It is to be noted that, while a case in which a traffic amount is acquired by acquisition of MIB information is described here, also it is possible to acquire a traffic amount by a different method. For example, the acquisition section 15a performs SSH coupling to a communication apparatus 30 and logs in to the communication apparatus 30 and then transmits a command of a show type to the communication apparatus 30. Consequently, the acquisition section 15a may acquire interface information such as a traffic amount at each port as a return value of the command from the communication apparatus 30.

The selection section 15b is a processing section that selects traffic to be made a learning target.

As one embodiment, in the case where the selection section 15b accepts an execution instruction of learning from the client terminal 50 or a number of histories of traffic corresponding to a given sample number are accumulated as the traffic information 13b into the storage section 13, the selection section 15b executes such processes as described below. For example, the acquisition section 15a refers to the topology information 13a stored in the storage section 13 to select a communication apparatus 30 that is to receive first traffic inputted from the outside of the network NW to the inside of the network NW and another communication apparatus 30 that is to transmit second traffic to be outputted from within the network NW to the outside of the network NW. Then, the selection section 15b selects, for each of the communication apparatus 30 that receive first traffic, a port to be used for reception of first traffic from among ports the communication apparatus 30 includes and selects, for each of the communication apparatus 30 that transmits second traffic, a port to be used for transmission of second traffic from among ports the communication apparatus 30 includes.

The first setting section 15c is a processing section that sets initial parameters of a model of a neural network.

As one embodiment, the first setting section 15c sets, based on a number of first traffics and a number of second traffics selected by the selection section 15b, an input number of the input layer and an output number of the output layer of the neural network. For example, the first setting section 15c sets a number of neurons equal to the number of ports to be used for reception of first traffic to the input layer of the model and sets a number of neurons equal to the number of ports to be used for transmission of second traffic to the output layer of the model. Further, the first setting section 15c sets a layer number of hidden layers and an initial value of a neuron number for each of the hidden layers. For this initial value, as an example, a fixed value may be used irrespective of the scale of the network NW. Alternatively, the initial value may be set based on the topology information 13a. For example, the initial value may be set in response to the number of communication apparatus 30. Further, in the case where the error does not converge to a value within a given threshold value after execution of model learning by the learning execution section 15e, the first setting section 15c may change the settings for the layer number of hidden layers and the neuron number of each of the hidden layers.

The second setting section 15d is a processing section that sets learning parameters of a model of the neural network.

As one embodiment, the second setting section 15d sets a number of samples to be used for learning of a model, a number of times for carrying out learning of a model and so forth as learning parameters. In the following, the number of samples to be used for learning of a model is sometimes referred to as "learning sample number," and the number of times by which learning of a model is carried out is sometimes referred to as "learning time number." For the learning parameters, as an example, values set by a developer, a designer or the like of the management program described above may be used, and also it is possible for a network manager to set values by calculating back from the accuracy required by the network manager.

The learning execution section 15e is a processing section that executes depth learning, namely, deep learning, in which a neural network of a multilayer structure is used as a model.

As one embodiment, the learning execution section 15e reads out, from within the traffic information 13b stored in the storage section 13, first traffic measured at a port to be used for reception of first traffic and second traffic measured at a port to be used for transmission of second traffic. At this time, as an example, the learning execution section 15e reads out, as a data set, a number of histories of first traffics and second traffics corresponding to the number of learning samples set by the second setting section 15d going back from the time at which learning is started from the storage section 13.

Thereafter, the learning execution section 15e executes the following processes for each of the samples included in the data set. For example, in the case of the example depicted in FIG. 4, the learning execution section 15e inputs actual measurement values of the first traffics TR11, TR12 and TR13 to the input layer of the model of the neural network to estimate second traffics TR21 to TR23. Thereafter, the learning execution section 15e executes learning of a model that minimizes differences, for example, mean square errors or average square-square errors, between the estimation values of the second traffics TR21 to TR23 to be outputted from the model and actual measurement values of the second traffics TR21 to TR23. For example, the network management apparatus 10 carries out correction of a weight in accordance with a correction amount for a weight determined for each neuron of each layer in order from the output layer toward the input layer using a gradient of error. After such learning is executed for each sample, the learning execution section 15e repetitively executes learning of the data set over the learning time number set by the second setting section 15d. Parameters of the model obtained as a result of the execution of such learning, for example, layer structures such as neurons and synapses of each of the input layers including hidden layers and output layer that form the neural network and parameters such as weights and biases of each layer are stored as the model information 13c into the storage section 13.

The estimation section 15f is a processing section that estimates second traffic using a model of a neural network.

As one embodiment, the estimation section 15f may execute, after the model information 13c is stored into the storage section 13, the following processes every time first traffic corresponding to each neuron of the input layer is acquired by the acquisition section 15a. For example, in the case of the example depicted in FIG. 4, the estimation section 15f inputs actual measurement values of the first traffics TR11, TR12 and TR13 corresponding to each neuron of the input layer acquired by the acquisition section 15a to the input layer of the model defined by the model information 13c. Consequently, results of calculation of the second traffics TR21 to TR23, for example, estimation values, are outputted from the output layer of the model.

The comparison section 15g is a processing section that compares estimation values and actual measurement values of second traffic.

As one embodiment, the comparison section 15g compares estimation values of the second traffic estimated by the estimation section 15f and actual measurement values of the second traffic acquired by the acquisition section 15a with each other. For example, in the case of the example of FIG. 4, the comparison section 15g decides whether or not the difference between the estimation value and the actual measurement value of the second traffic TR21, the difference between the estimation value and the actual measurement value of the second traffic TR22 and the difference between the estimation value and the actual measurement value of the second traffic TR23 are equal to or higher than a given threshold value. It is to be noted that, while a case in which an estimation value and an actual measurement value of the second traffic TR22 are compared with each other is exemplified as an example here, a given threshold value may be used in place of the actual measurement value of the second traffic such that the estimation value of the second traffic TR22 and the given threshold value are compared with each other.

The outputting section 15h is a processing section that outputs a result of comparison by the comparison section 15g.

As one embodiment, every time an estimation value and an actual measurement value of second traffic are compared with each other by the comparison section 15g, the outputting section 15h may output the difference between the estimation value and the actual measurement value of the second traffic to the client terminal 50. Further, in the case where the difference between the estimation value and the actual measurement value of the second traffic is equal to or higher than the threshold value, the outputting section 15h may output an alert to the client terminal 50. At this time, the outputting section 15h may output an alert only in the case where the actual measurement value is higher than the estimation value or only in the case where the estimation value is higher than the actual measurement value. It is to be noted that, in the case where the estimation value of the second traffic TR22 is equal to or higher than the threshold value, an alert may be outputted.

[Flow of Processing]

Now, a flow of processing of the network management apparatus 10 according to the present working example is described. Here, (1) a learning process executed by the network management apparatus 10 is described first, and (2) a monitoring process of traffic executed by the network management apparatus 10 is described.

(1) Learning Process

Figure 6:
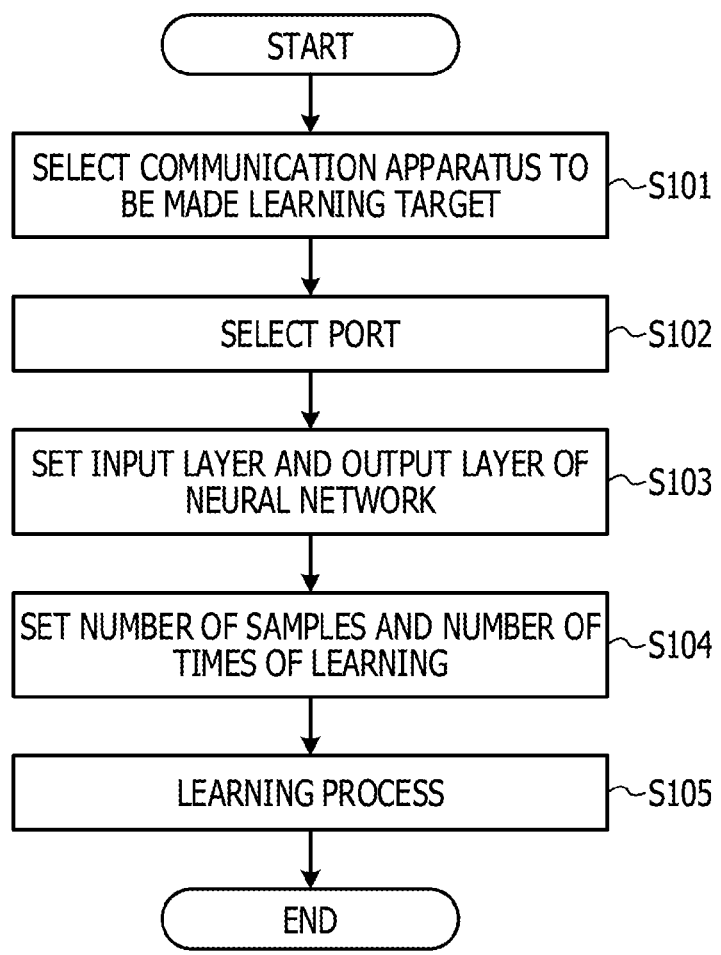
FIG. 6 depicts a procedure of a learning process according to the working example 1.

FIG. 6 depicts a procedure of a learning process according to the working example 1. This process is started, as an example, in the case where an execution instruction of learning is accepted from the client terminal 50 or in the case where a number of histories of traffic corresponding to a given sample number are stored as the traffic information 13b into the storage section 13.

As depicted in FIG. 6, the selection section 15b refers to the topology information 13a stored in the storage section 13 to select a communication apparatus 30 that is to receive first traffic inputted from the outside of the network NW to the inside of the network NW and another communication apparatus 30 that is to transmit second traffic to be outputted from the inside of the network NW to the outside of the network NW (step S101).

Then, the selection section 15b selects a port to be used for reception of first traffic from among the ports included by the communication apparatus 30 selected as the communication apparatus 30 that is to receive first traffic at step S101 and selects a port to be used for transmission of second traffic from among the ports included by the communication apparatus 30 selected as the communication apparatus 30 that is to transmit second traffic at step S101 (step S102).

Then, the first setting section 15c sets an input number of the input layer and an output number of the output layer of the neural network based on the number of first traffics and the number of second traffics selected at step S102 (step S103). Further, the second setting section 15d sets learning parameters such as the number of samples to be used for learning of the model and the number of times by which learning of the model is to be carried out (step S104).

Thereafter, the learning execution section 15e executes the following learning process for each sample included in data sets corresponding to the learning sample number set at step S104 over the learning time number set at step S104 (step S105). For example, the learning execution section 15e executes learning of a model that minimizes the error between estimation values of second traffics obtained by inputting actual measurement values of first traffics measured at the reception port for first traffic selected at step S102 to the input layer of the model set at step S103 and the actual measurement values of the second traffics.

(2) Monitoring Process of Traffic

Figure 7:
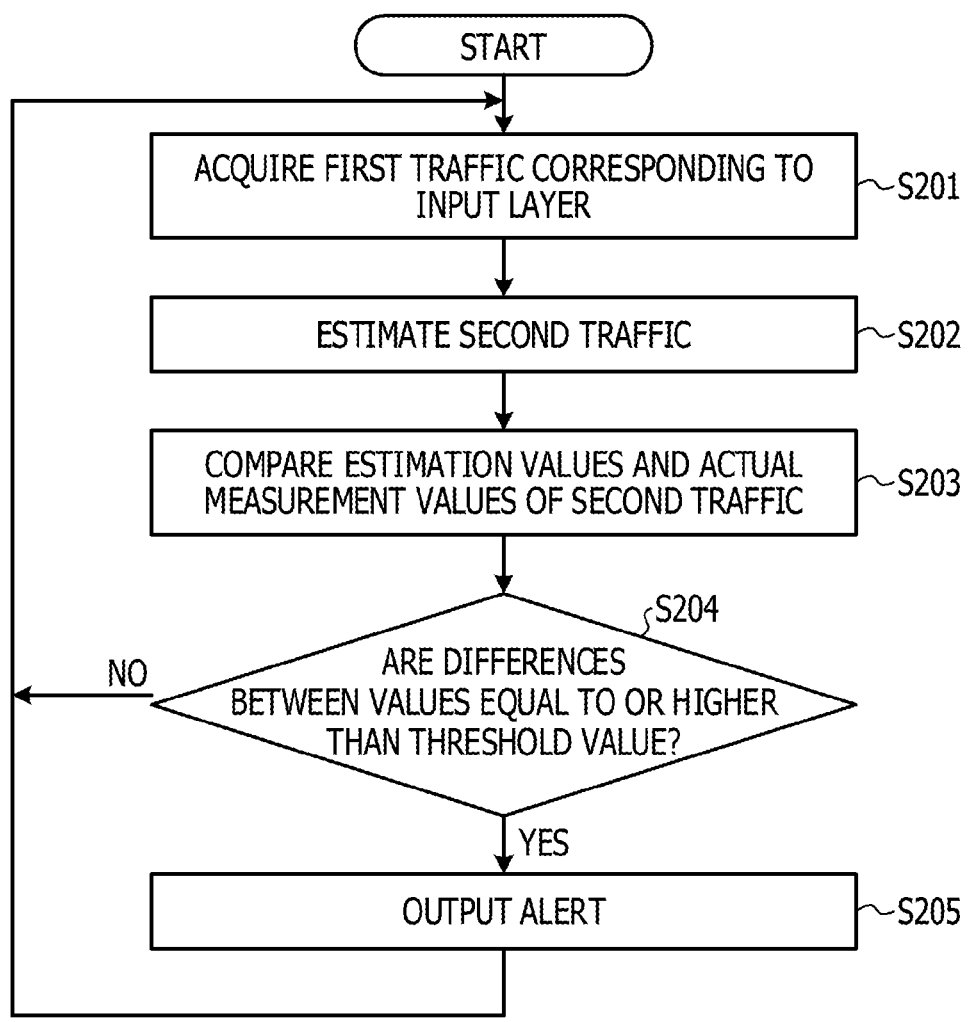
FIG. 7 depicts a procedure of a monitoring process of traffic according to the working example 1.

FIG. 7 depicts a procedure of a monitoring process of traffic according to the working example 1. This process may be executed, as an example, after the model information 13c is stored into the storage section 13.

As depicted in FIG. 7, if actual measurement values of the first traffic corresponding to each neuron of the input layer are acquired by the acquisition section 15a (step S201), the estimation section 15f inputs the actual measurement values of the first traffic corresponding to each neuron of the input layer acquired at step S201 to the input layer of the model defined by the model information 13c to estimate second traffic (step S202).

Then, the comparison section 15g compares the actual measurement values of the second traffic corresponding to each neuron of the output layer acquired by the acquisition section 15a and the estimation values of the second traffic estimated at step S202 with each other (step S203).

Here, in the case where the differences between the estimation values and the actual measurement values of the second traffic are equal to or higher than the threshold value (step S204: Yes), the outputting section 15h outputs an alert to the client terminal 50 (step S205) and advances the processing to step S201. On the other hand, in the case where the differences between the estimation values and the actual measurement values of the second traffic are not equal to or higher than the threshold value (step S204: No), the outputting section 15h skips the process at step S205 and advances the processing to step S201.

[One Aspect of Effect]

As described hereinabove, the network management apparatus 10 according to the present working example learns a model in which, based on first traffic inputted from the outside of the network NW to the inside of the network NW, second traffic to be outputted from the inside of the network NW to the outside of the network NW is estimated, and compares the estimation values and the actual measurement values of the second traffic with each other. Accordingly, it is possible for the network management apparatus 10 according to the present working example to analyze traffic of the entire network in perspective. Further, also it is possible for the network management apparatus 10 according to the present working example to appropriately analyze the behavior of traffic that varies complexly together with complication in scale or configuration of the communication network NW.

Working Example 2

Although the working example relating to the apparatus disclosed herein has been described, the present embodiment may be carried out in various different forms in addition to the working example described above. Therefore, other working examples included in the present embodiment are described below.

[Estimation of First Traffic]

While the working example 1 described hereinabove exemplifies a case in which a model that estimates second traffic from actual measurement values of first traffic is learned, also it is possible to learn a model in which first traffic is estimated from actual measurement values of second traffic.

Figure 8:
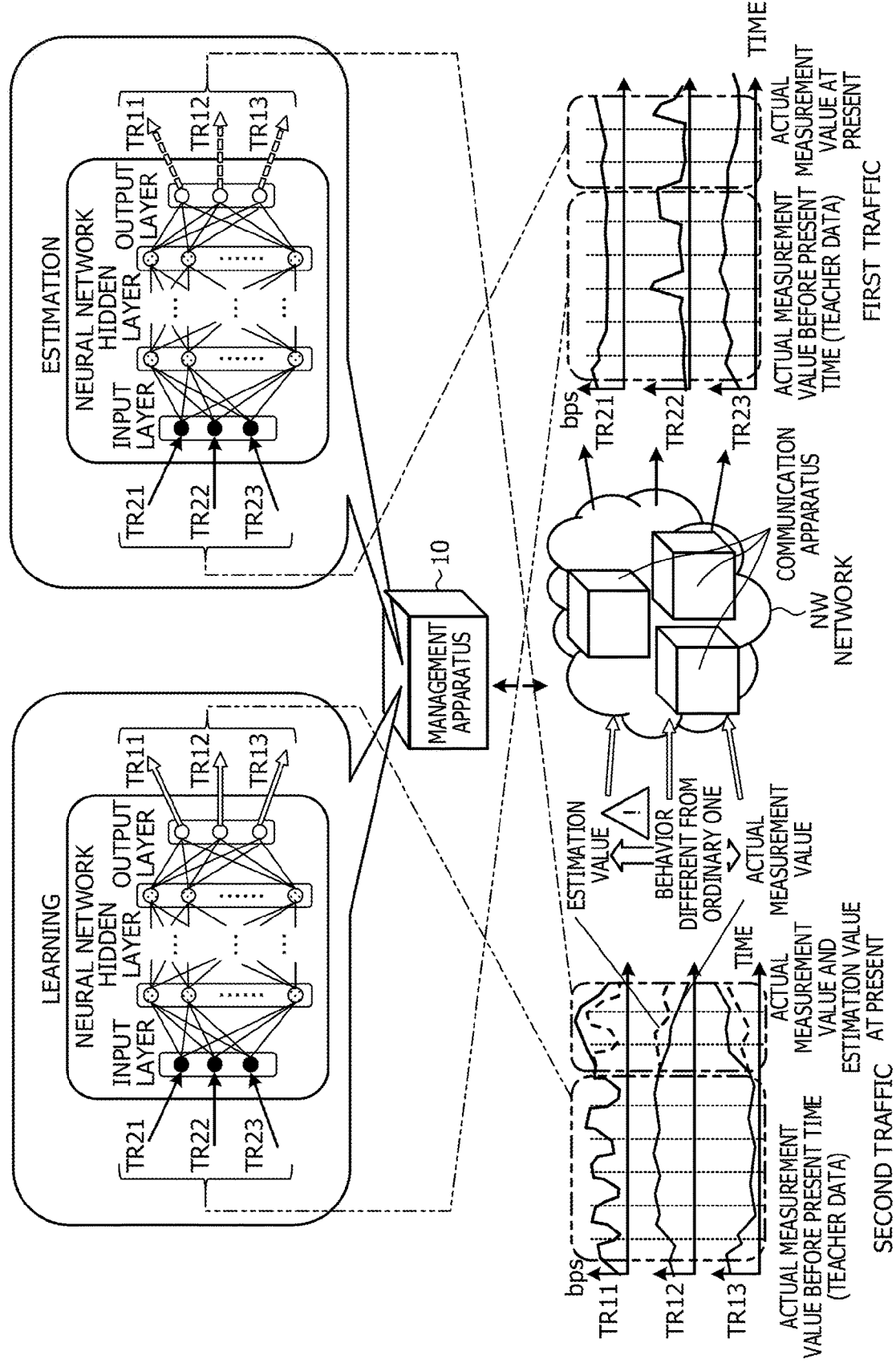
FIG. 8 depicts another example of the learning method of traffic.

FIG. 8 depicts another example of the learning method of traffic. TR11, TR12 and TR13 depicted in FIG. 8 denote first traffics that are transmitted from some end host and inputted to the network NW and then transferred in the network NW. Further, TR21, TR22 and TR23 depicted in FIG. 8 denote second traffics that are transferred in the network NW until they are finally outputted toward some end host.

Here, the network management apparatus 10 uses, as teacher data of depth learning, namely, deep learning, for which a neural network of a multilayer structure is used, histories of actual measurement values of the first traffics TR11 to TR13 and actual measurement values of the second traffics TR21 to TR23 at different timings similarly as in the working example 1 described hereinabove. However, the network management apparatus 10 is different from that in the working example 1 in that, as input data to be inputted to the input layer, actual measurement values of the second traffics TR21 to TR23 are inputted to the input layer of the model in place of actual measurement values of the first traffics TR11 to TR13 to estimate the first traffics.

For example, in the case where a stochastic gradient descent method is used, the network management apparatus 10 uses a history of actual measurement values of the second traffics TR21 to TR23 and actual measurement values of the first traffics TR11 to TR13 at a certain point of time as one sample. For example, the network management apparatus 10 estimates the first traffics TR11 to TR13 by inputting actual measurement values of the second traffics TR21, TR22 and TR23 to the input layer of a model of a neural network. Then, the network management apparatus 10 executes learning of a model that minimizes the error between the estimation values of the first traffics TR11 to TR13 outputted from the model and actual measurement values of the first traffics TR11 to TR13.

After model learning of the neural network is executed in this manner, the network management apparatus 10 inputs the values of the second traffics TR21 to TR23 at present to the input layer of the neural network for which the optimization of weighting coefficients has been performed by the model learning, whereupon a calculation result of the first traffics TR11 to TR13 to be outputted from the output layer of the model is obtained. This calculation result may be regarded as estimation values of the first traffics TR11 to TR13 at present estimated based on an ordinary behavior with respect to the second traffics TR21 to TR23.

Thereafter, every time estimation values of the first traffics TR11 to TR13 are obtained as a calculation result, the network management apparatus 10 compares the estimation values of the first traffics TR11 to TR13 and actual measurement values of the first traffics TR11 to TR13 at the same timing measured by the communication apparatus 30 of the network NW. For example, it is decided whether or not the difference between the estimation value and the actual measurement value of the first traffic TR11, the difference between the estimation value and the actual measurement value of the first traffic TR12 and the difference between the estimation value and the actual measurement value of the first traffic TR13 are equal to or higher than a given threshold value.

Based on the result, the network management apparatus 10 may analyze whether the actual measurement values of the first traffics TR11 to TR13 have a tendency same as an ordinary tendency or have a tendency different from the ordinary tendency and detect whether or not a behavior different from an ordinary behavior occurs. For example, in the case where the difference between the estimation value and the actual measurement value is equal to or higher than the threshold value, the network management apparatus 10 compares the estimation value and the actual measurement value with each other in magnitude. Then, in the case where the actual measurement value is higher than the estimation value, the network management apparatus 10 may detect that the tendency of the traffic inputted from the outside of the network NW is different from the ordinary tendency and that the traffic indicates such abnormally many behaviors as is outside the range of a usual scope of assumption. On the other hand, in the case where the actual measurement value is lower than the estimation value, the network management apparatus 10 may detect that the tendency of the traffic inputted from the outside of the network NW is different from the ordinary tendency and that the traffic indicates such abnormally few behaviors as is outside the range of a usual scope of assumption. The network management apparatus 10 may output an alert of at least one of the behaviors to the client terminal 50.

In this manner, the network management apparatus 10 may analyze the behavior of traffic inputted from the outside of the network NW. Further, by combination with the working example 1 described above, also it is possible for the network management apparatus 10 to analyze the behavior of traffic inputted from the outside of the network NW and the behavior of traffic outputted to the outside of the network NW.

[Learning Using Utilization Information of Network]

Also it is possible for the network management apparatus 10 to estimate second traffic using utilization information of a network in addition to actual measurement values of first traffic and actual measurement values of second traffic.

Figure 9:
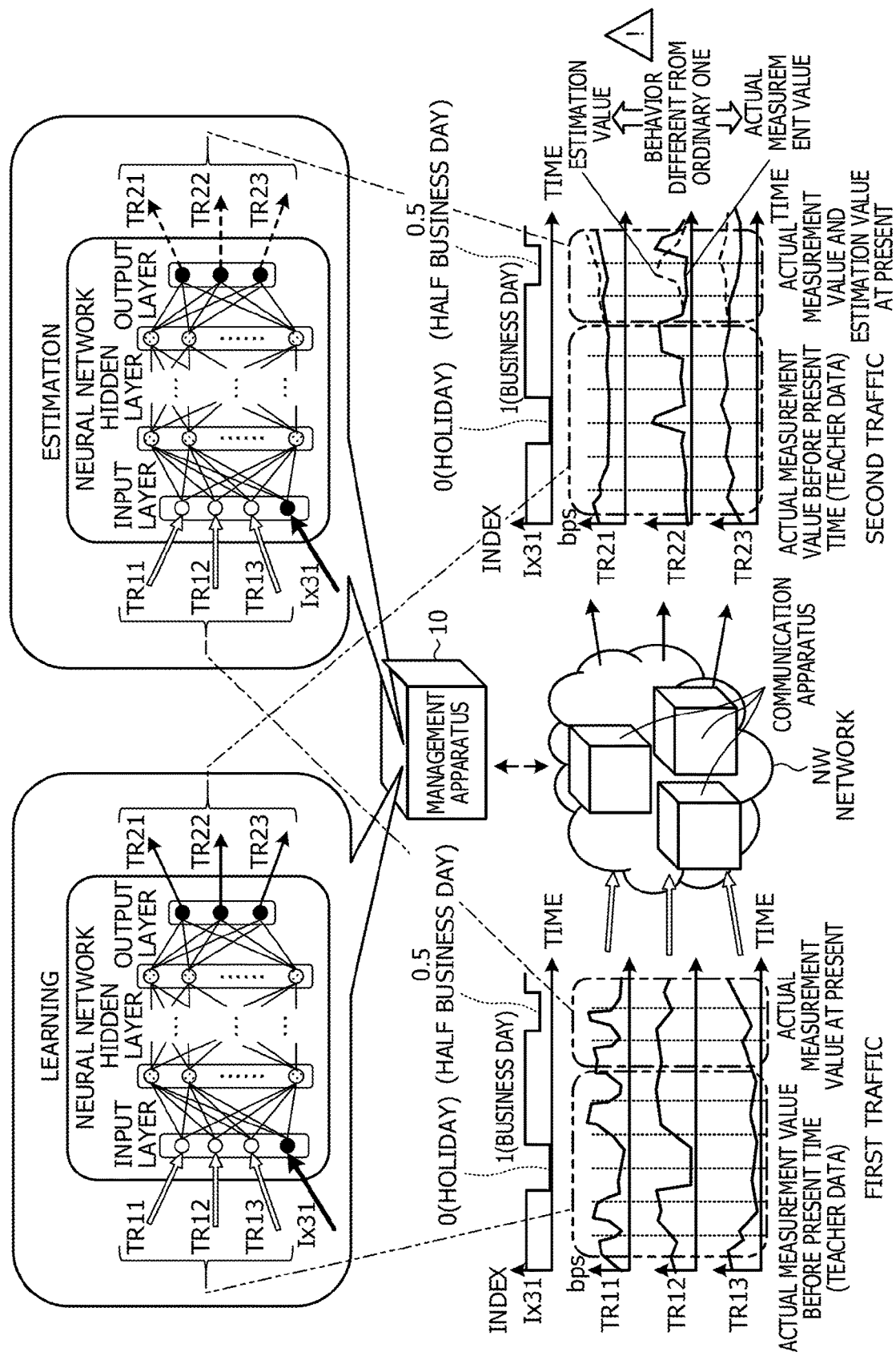
FIG. 9 depicts a further example of the learning method of traffic.

Here, as an example of the utilization information of the network, an index to a working day, namely, a business day, of an end host a terminal apparatus, a server apparatus or the like, may be adopted. FIG. 9 depicts a further example of the learning method of traffic. For example, in the case where a business operator to whom the end host belongs is such an organization as an enterprise or an institution, such an index as "0," "1," or "0.5" may be applied depending upon the day of the week or a public holiday in the calendar, a business day or a holiday prescribed by the organization, or business hours, holiday hours or the like. If a specific example is given, "1" is applied to traffic that is measured on the date on which business is performed over the whole day in the morning and afternoon like a weekday from the Monday to the Friday. On the other hand, "0.5" is applied to traffic that is measured on the date on which half-day business is performed in the morning or in the afternoon, namely, on a half holiday. Further, "0" is applied to traffic that is measured on a business holiday such as the Sunday or a public holiday.

As depicted in FIG. 9, also it is possible for the network management apparatus 10 to further refer to index data Ix31 to which the index described above is given to input actual measurement values of first traffic with the index as a sample of learning to the input layer of the model. For example, to the input layer of the model, a neuron to which the index defined in the index data Ix31 is to be inputted is set in addition to the first traffics TR11 to TR13, "0," "0.5" or "1" is inputted in accordance with the index defined in the index data Ix31 to the neuron. Consequently, the estimation accuracy of the second traffics TR21 to TR23 may be improved.

[Learning of Traffic of Communication Apparatus Positioned on Edge]

The selection section 15b may select, as traffic to be made a learning target, first traffic to be received by a communication apparatus 30 positioned on an edge of the network NW or second traffic to be transmitted from a communication apparatus 30 positioned on an edge of the network NW.

Figure 10:
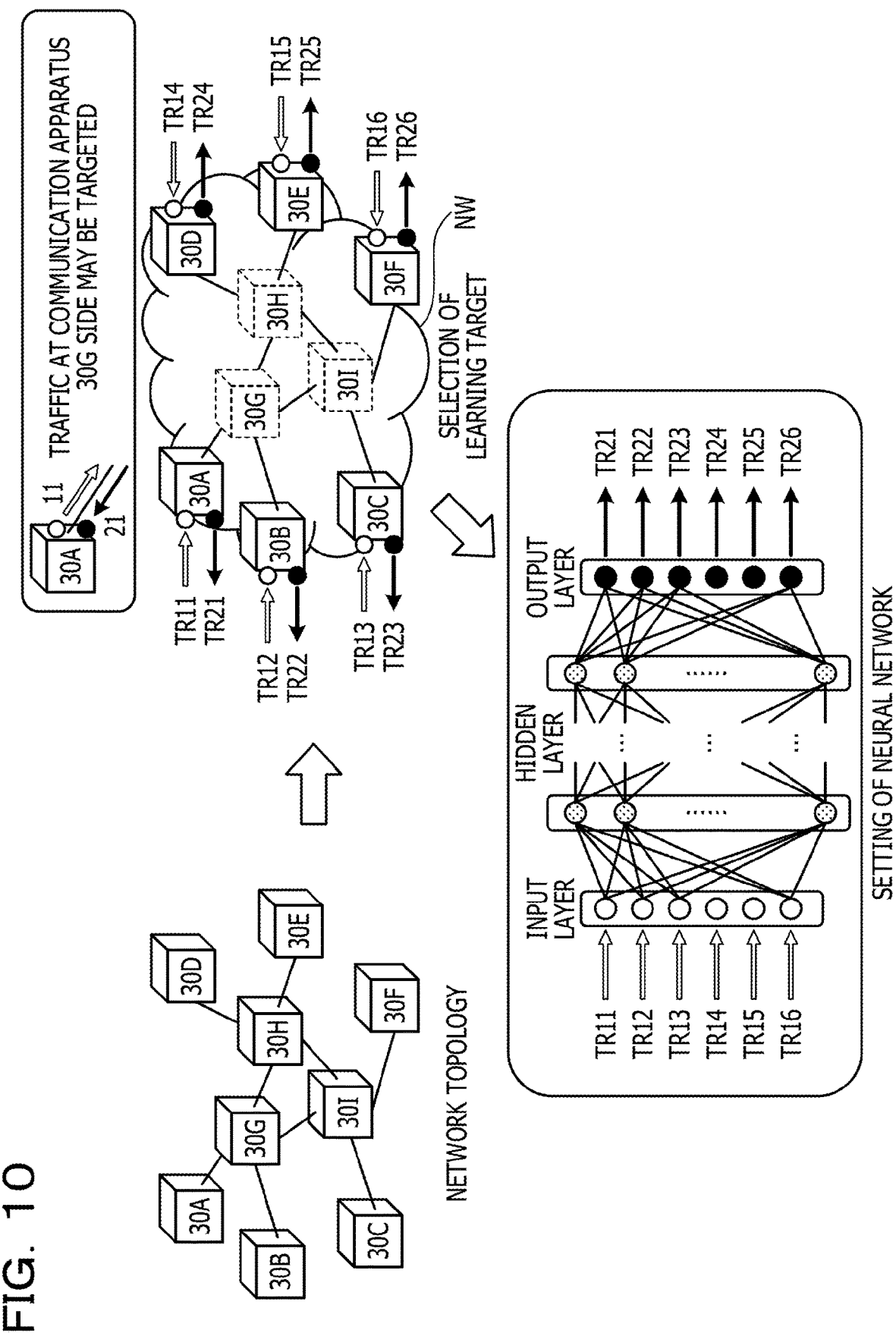
FIG. 10 depicts a still further example of the learning method of traffic.

FIG. 10 depicts a still further example of the learning method of traffic. In FIG. 10, topology of nine communication apparatus 30A to 30I included in a network NW is depicted. While it is depicted in FIG. 10 that the different communication apparatus 30 are individually coupled by a single link, they may not necessarily be coupled by a single link but may be coupled by a plurality of links including a link coupled to an access port or a link coupled to a trunk port.

In the case where a network NW is formed by the topology depicted in FIG. 10, the communication apparatus 30A to 30F are each coupled to an end host or a network different from the network NW and may be identified that they are positioned on an edge of the network NW. On the other hand, the communication apparatus 30G to 30I relay a packet transferred from the communication apparatus 30A to 30F and may be identified that they are positioned in the inside of the network NW.

In such a case as just described, the selection section 15b selects the communication apparatus 30A to 30F as a learning target. Further, the selection section 15b selects, from among the ports the communication apparatus 30A to 30F include, a port at which first traffic is to be received and another port from which second traffic is to be transmitted. For example, if the communication apparatus 30A is taken as an example, a port at which the first traffic TR11 is to be received and another port from which the second traffic TR21 is to be transmitted are selected as a learning target. Therefore, the learning execution section 15e inputs actual measurement values of the first traffics TR11 to TR16 to the input layer of the model of the neural network to estimate second traffics TR21 to TR26. Then, the learning execution section 15e executes learning of a model that minimizes the error between the estimation values, outputted from the model, of the second traffics TR21 to TR26 and actual measurement values of the second traffics TR21 to TR26.

Consequently, the network management apparatus 10 may reduce the calculation amount in model learning even where the network NW is great in scale including many communication apparatus 30. It is to be noted that, while FIG. 10 exemplifies a case in which the communication apparatus 30A to 30F use the first traffics TR11 to TR16 and the second traffics TR21 to TR26, which are measured at the ports on the side on which they are coupled to an end host of a transmission source or a transmission destination, for learning, first traffic measured at ports on the side on which they are coupled to the communication apparatus 30G to 30I may be used for model learning. This is because the total of the first traffics and the total of the second traffics measured at the ports of the communication apparatus 30A to 30F on the side coupled to the communication apparatus 30G to 30I are equivalent to the total of the first traffics TR11 to TR16 and the total of the second traffics TR21 to TR26 measured at the ports on the side coupled to the end host of the transmission source or the transmission destination, respectively.

[Learning of Traffic of Designated Layer]

Also it is possible for the selection section 15b to select, as traffic to be made a learning target, traffic to be transmitted from and received by communication apparatus 30 positioned in a given layer.

Figure 11:
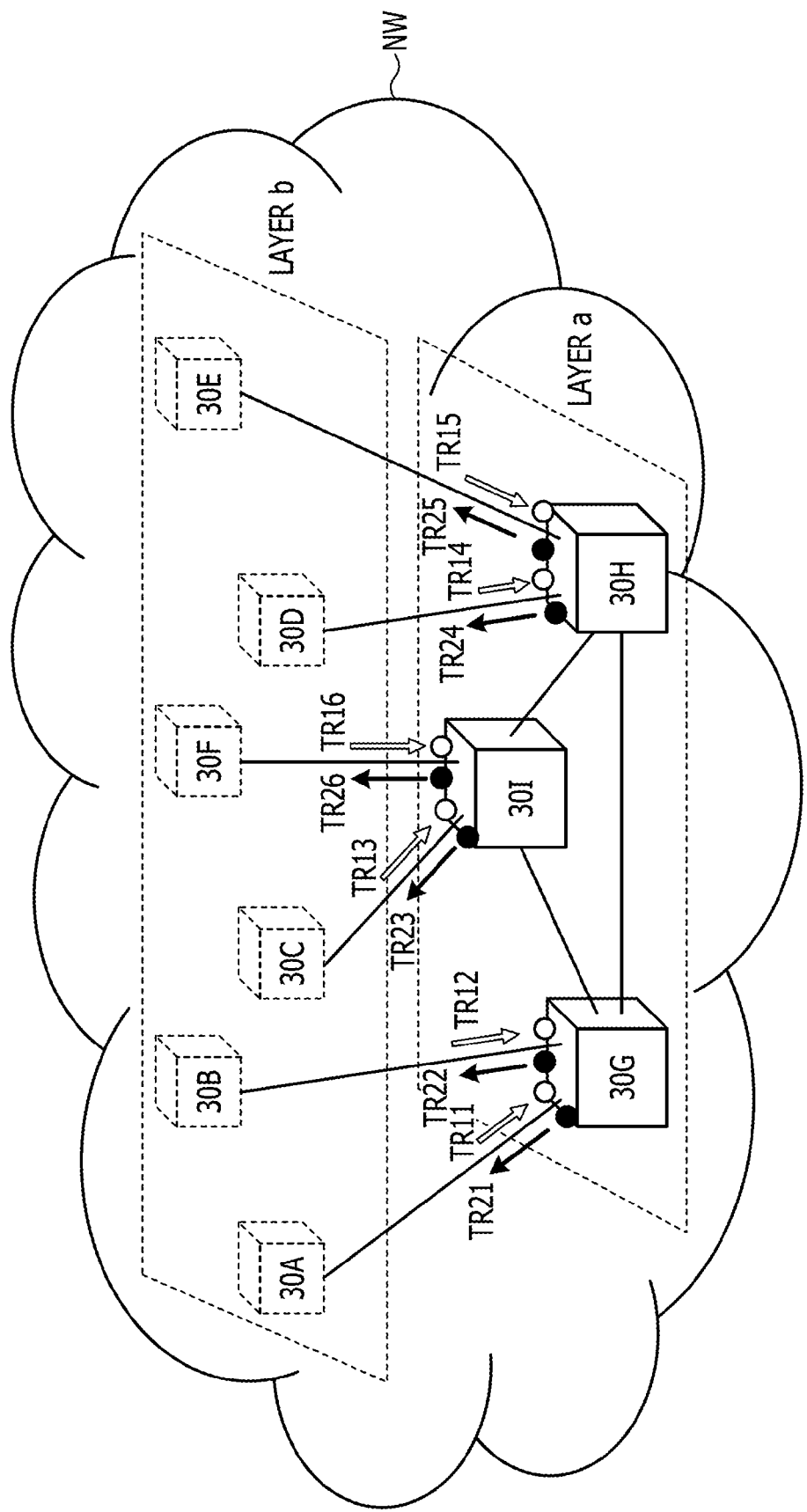
FIG. 11 depicts an example of traffic by layer.

FIG. 11 depicts an example of traffic by layer. In FIG. 11, topology of nine communication apparatus 30A to 30I included in a network NW is depicted. As depicted in FIG. 11, the network NW includes two layers of a layer a and another layer b. The layer a includes the three communication apparatus 30G to 30I each configured from an Ethernet (registered trademark) switch that transfers an Ethernet (registered trademark) frame, an MPLS switch or the like. Meanwhile, the layer b is an upper layer than the layer a and includes the six communication apparatus 30A to 30F each configured from a router that performs IP routing or the like.

Here, as an example, when the layer a is selected as a monitoring target through an inputting operation to the client terminal 50, the network management apparatus 10 identifies the layer a as a learning target. In this case, the network management apparatus 10 uses first traffics TR11 to TR16 transmitted from the communication apparatus 30A to 30F and received by the communication apparatus 30G to 30I as values of the input layer of the neural network and uses second traffics TR21 to TR26 relayed in response to a transmission destination by the communication apparatus 30G to 30I and transmitted from the communication apparatus 30G to 30I toward the communication apparatus 30A to 30F as values of the output layer of the neural network to execute the above-described learning.

For example, the selection section 15b selects the communication apparatus 30G to 30I as a learning target. Further, the selection section 15b selects, from among the ports the communication apparatus 30G to 30I include, a port that is to receive first traffic from an opposing port of the communication apparatus 30A to 30F and a port from which second traffic is to be transmitted to an opposing port of the communication apparatus 30A to 30F. For example, if the communication apparatus 30G is taken as an example, a port for receiving the first traffic TR11 and another port for receiving the first traffic TR12 as well as a port from which the second traffic TR21 is to be transmitted and another port from which the second traffic TR22 is to be transmitted are selected as a learning target. Thereafter, the learning execution section 15e inputs actual measurement values of the first traffics TR11 to TR16 to the input layer of the model of the neural network to estimate second traffics TR21 to TR26. Then, the learning execution section 15e executes learning of a model that minimizes the error between the estimation values of the second traffics TR21 to TR26 to be outputted from the model and the actual measurement values of the second traffics TR21 to TR26.

Consequently, even if the network NW includes a large scale network including many communication apparatus 30 and including a plurality of layers, it may be detected whether or not a behavior different from an ordinary behavior occurs by selecting as a desired layer.

[Determination of Learning Sample Number]

In the case where traffic of a communication network is learned, the estimation accuracy of traffic may not necessarily increase as the learning sample number increases. For example, a communication network has various traffic characteristics. For example, a communication network may include a link that repeats a similar traffic transition every day or may include a link in which the traffic transits weekdays in the same manner and transits weekend differently from weekdays, and that indicates a characteristic that such transition repeats every week. Occasionally, a characteristic of traffic changes at a certain point of time, for example, as a result of increase or decrease of the user number, change of the network configuration or the like performed after a certain period of time elapses.

As an example of learning and pattern recognition by a neural network, in the case where a data pattern whose characteristic does not vary is learned as in widely known recognition of a hand-written numeral or a photograph of an animal, as the learning sample number increases, the estimation accuracy further improves. However, in the case where traffic of a communication network is learned by a neural network, the traffic characteristic differs for each traffic and is not invariable but sometimes varies as time passes. Therefore, in the case where traffic of a communication network is learned, it is not necessarily better that a greater number of actual measurement values of traffic in the past to be used as teacher data are available, and if learning is performed using old data prior to a point of time at which the traffic characteristic changed, the error may increase rather.

Figure 12:
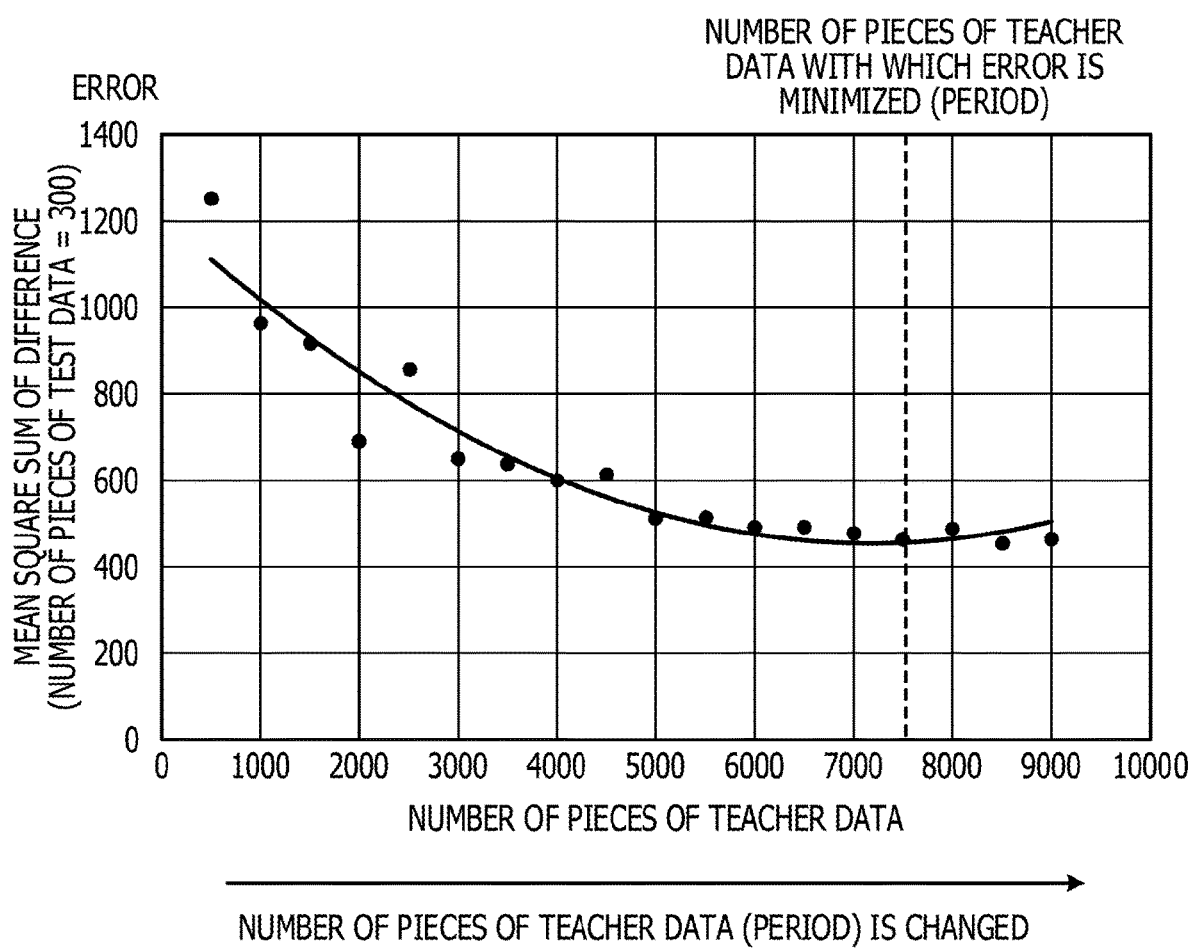
FIG. 12 depicts an example of a relationship between a learning sample number and an error.

FIG. 12 depicts an example of a relationship between a learning sample number and an error. The axis of ordinate of the graph depicted in FIG. 12 indicates the mean square sum of the error, for example, the difference between an estimation value and an actual measurement value, and the axis of abscissa indicates the number of learning samples to be used as teacher data. Here, as an example, in the case where learning samples are actual measurement values of first and second traffic measured in a cycle of 5 minutes, this signifies that, if the teacher data number is 1000, actual measurement data within a period from last 5 minutes to 5000 minutes ago are used as learning samples, and that, if the teacher data number of 2000, actual measurement data within a period from last 5 minutes to 10000 minutes ago are used as learning samples. As depicted in FIG. 12, where the learning sample number increases to 5000 or the like, there is a tendency that, as the learning sample number increases, the error decreases. However, where the learning sample number increases further from 5000, the tendency does not become applicable. For example, where the learning sample number comes to approximately 7500, the error becomes minimum, and after the learning sample number exceeds 7500, a phase in which the error increases is entered. Then, where the learning sample number reaches 9000 or so, the error increases as compared with the case in which the learning sample number is 7500.

From this, the second setting section 15d may learn traffic for each of a plurality of candidates for a learning sample number, and a model learned by a candidate for a learning sample number in which the error is least may be used for estimation of traffic.

For example, the network management apparatus 10 may experimentally perform learning by a given number of learning times while the learning sample number is successively changed by changing the period of a history of an actual measurement value of traffic in the past to be used as teacher data and adopt a learning sample number with which the error is minimum or that satisfies a given degree of accuracy. For example, histories of an actual measurement value of traffic for one day in the past, five days in the past and seven days in the past may be used as teacher data to perform learning, and if the error is minimum with the history for five days in the past, the teacher data for five days in the past may be used to perform learning in the succeeding cycle or cycles.

Figure 13:
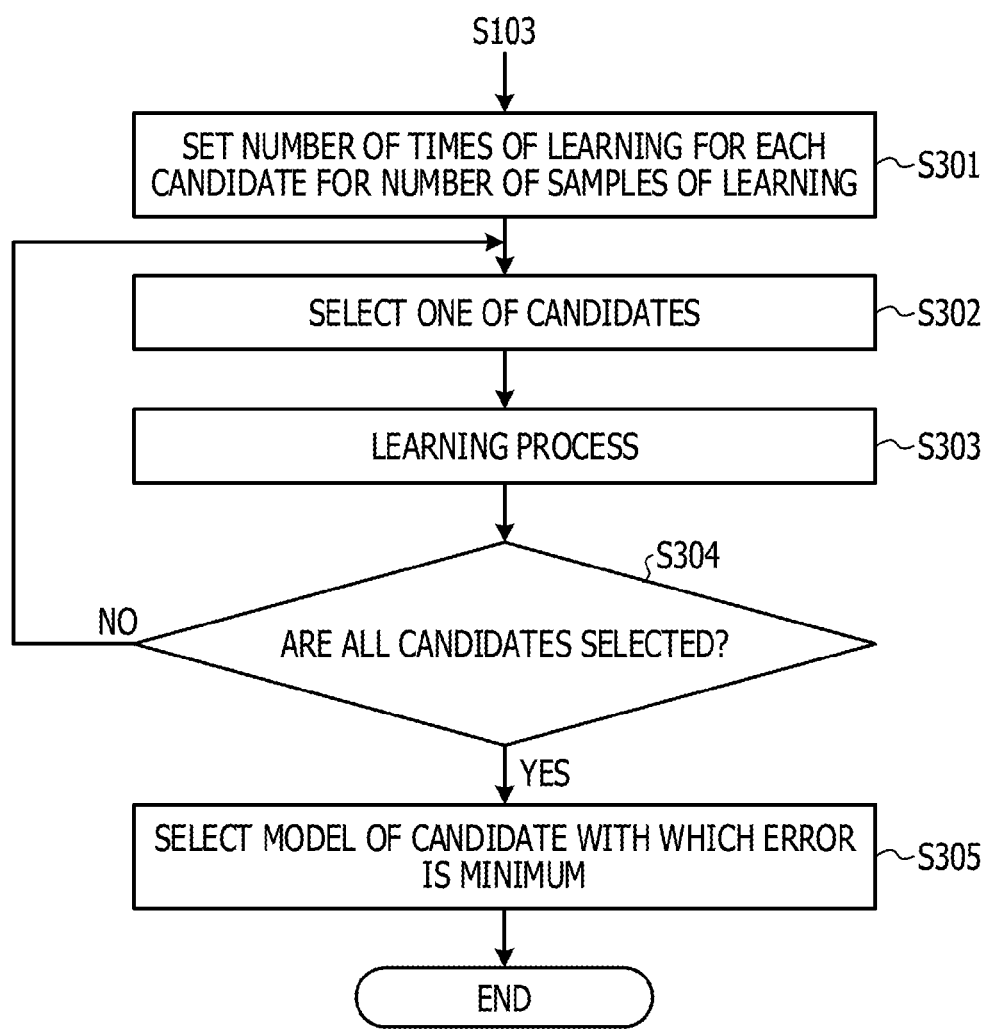
FIG. 13 depicts a procedure of a learning process according to an application example.

FIG. 13 depicts a procedure of a learning process according to an application example. In FIG. 13, steps different in procedure from the flow chart depicted in FIG. 6 are indicated in excerpt. As depicted in FIG. 13, after an input number to the input layer and an output number of the output layer of a neural network are set by the first setting section 15c (step S103), the second setting section 15d sets a same learning time number for a plurality of candidates for a learning sample number (step S301).

Thereafter, the learning execution section 15e selects one candidate from among the plurality of candidates for a learning sample number (step S302). Then, the learning execution section 15e executes a learning process for each of the number of samples included in the data set corresponding to the learning sample number selected as the candidate at step S302 over the learning time number set at step S301 (step S303).

Then, the processes at steps S302 and S303 described above are executed repetitively until all of the candidates for a learning sample number are selected (step S304: No). Thereafter, in the case where all candidates for a learning sample number are selected (step S304: Yes), the learning execution section 15e selects, from among the models for which learning is performed for each candidate for a learning sample number, the model in which learning is performed with the candidate for a learning sample number with regard to which the error is minimum (step S305). Then, parameters of the model selected at step S305 are stored as the model information 13c into the storage section 13.

Consequently, the number of pieces of teacher data to be used for learning may be suppressed from becoming excessively great, and as a result, the estimation accuracy of traffic may be increased.

[Setting of Learning Time Number]

As described hereinabove, a communication network has various traffic characteristics. Also the scale of a communication network, for example, the number of traffics that become a target of learning, is various. For example, a communication network includes not only a link that indicates a monotonous traffic characteristic that similarly indicates less time change every day but also a link that indicates a traffic characteristic that changes complexly from day to day or from time zone to time zone. When learning is performed by a neural network, in the case where learning of a complex data pattern like the latter is performed, a greater number of learning times are required than that in the case where a monotonous data pattern like the former is learned. Therefore, the second setting section 15d decides convergence of the error while the learning time number is successively increased such that it may adopt a learning time number at which the error is minimum, a learning time number when the error becomes to a level within a given threshold value or a learning time number that satisfies a given degree of estimation accuracy. Note that it is a matter of course that, even if the error is within the threshold value or satisfies the estimation accuracy degree, the learning time number may be increased until the error converges.

Figure 14:
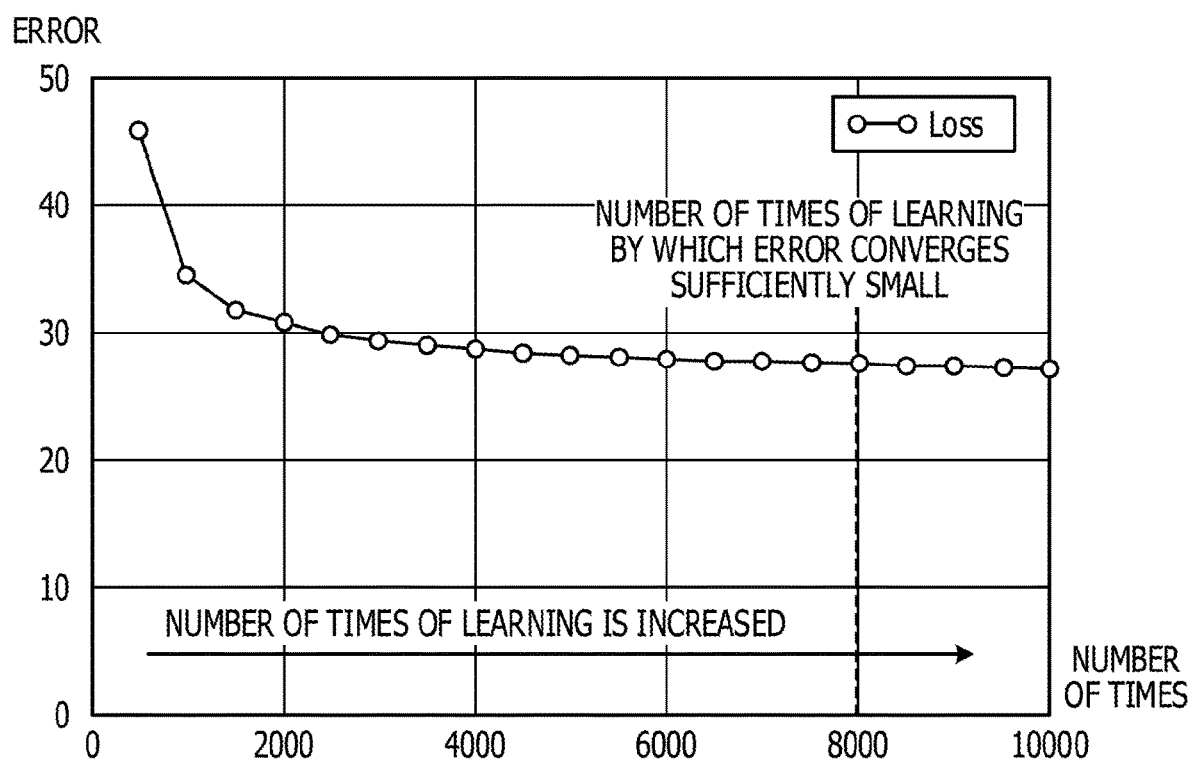
FIG. 14 depicts an example of a relationship between a learning time number and an error.

FIG. 14 depicts an example of a relationship between a learning time number and an error. The axis of ordinate of a graph depicted in FIG. 14 indicates the error, and the axis of abscissa indicates the learning time number. In FIG. 14, an example is depicted in which learning of traffic is performed while the learning time number is successively increased by 1000 times from 1000 times to 10000 times. As depicted in FIG. 14, in the case where the error does not become smaller any more but converges where the learning time number is 8000 times or more, the learning execution section 15e stores parameters of the model for which learning is performed by the learning time number of 8000 as the model information 13c into the storage section 13. In this case, also it is possible for the second setting section 15d to set, in succeeding or later learning, the learning time number to 8000.

Consequently, it is possible to suppress, while desired estimation accuracy is satisfied, the calculation time number for learning from becoming excessively great to reduce the calculation amount in model learning.

[Re-Setting of Parameter of Model]

In the case where the error does not converge to a level within a given threshold value even if learning of a data set is repeated over a fixed number of times, for example, over 8000 times, also it is possible for the first setting section 15c to increase the number of hidden layers included in the model or the number of neurons included in the hidden layers. For example, even if the learning time number is sufficient to allow the error to converge, the error sometimes converges and does not become smaller in a state in which it does not become within the threshold value. In such a case as just described, it is considered that this arises from that the number of hidden layers of the neural network or the number of neurons is excessively small with respect to a complicated input and output data pattern to be learned. From this, also it is possible for the first setting section 15c to increase the number of hidden layers included in the model or the number of neurons to be included in the hidden layers.

FIG. 15 depicts an example of change of the number of hidden layers and neurons. In FIG. 15, as an example, a model of a neural network is depicted in which three first traffics TR11 to TR13 are inputted to the input layer and three second traffics TR21 to TR23 are outputted from the output layer. For example, in the case where the error does not converge to a level within a threshold value even if a model in which the number of hidden layers is 1 and the number of neurons of the hidden layer is 4, while the number of hidden layers is left 1, the first setting section 15c may increase the number of neurons of the hidden layer from 4 to 6 as depicted at a left portion in FIG. 15. In the case where even this does not cause the error to converge to a level within the threshold value, also it is possible for the first setting section 15c to increase the number of hidden layers from 1 to 2 as depicted at a right portion in FIG. 15. It is to be noted that, while FIG. 15 exemplifies a case in which two hidden layers each having 6 neurons are set, the number of hidden layers may be changed to 2 while the neuron number remains 4. The number of hidden layers may be changed to 3 or more, and the neuron numbers of the respective hidden layers may be different from each other or may be equal to each other.

Consequently, since model learning may be continued until the error becomes within the threshold value, a model that satisfies a desired degree of estimation accuracy may be generated.

[Addition and Deletion of Traffic]

While FIG. 10 exemplifies an example in which, in the topology of the network NW, the traffic transmitted and received by the communication apparatus 30 positioned on an edge is selected as a learning target, depending upon the manner of flow of traffic, even if learning is performed, estimation in given accuracy sometimes results in failure.

A case is assumed in which the first traffics TR11 to TR13 (for example, it is assumed that the traffic amount of each of them is 100) received by the communication apparatus 30A to 30C depicted in FIG. 10 and inputted to the network NW are transferred, for example, because the end host (server or the like) that is a destination is changed by load distribution, migration of a virtual machine or the like, to one of the communication apparatus 30D to 30F and all traffics that are the total of the first traffics TR11 to TR13 are transmitted to the end host.

Figure 16A:
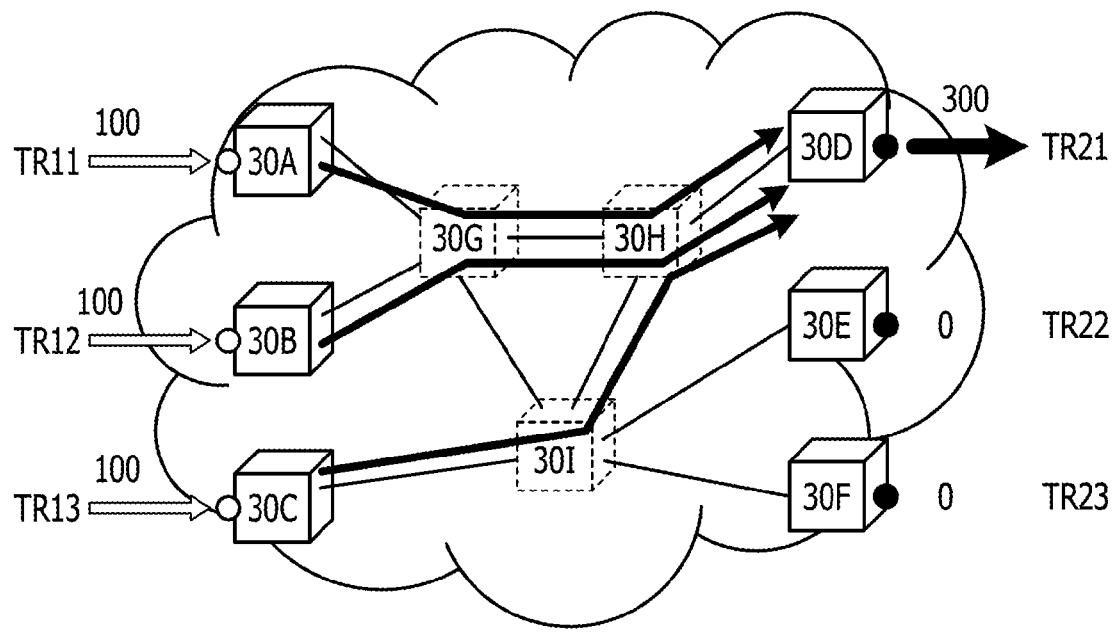
FIG. 16A depicts an example of traffic.
Figure 16B:
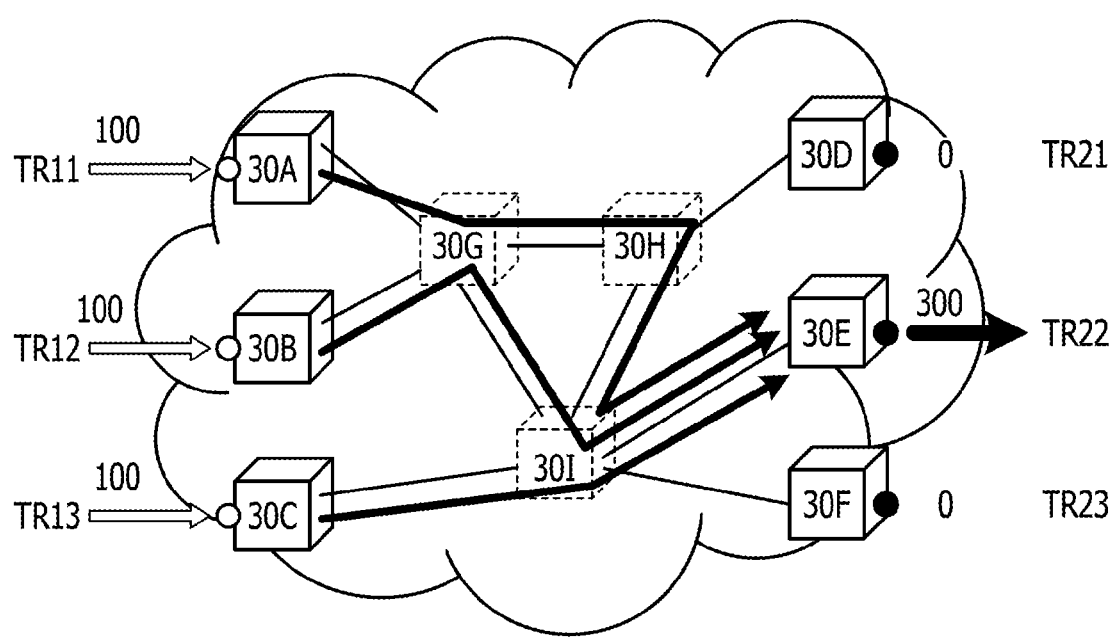
FIG. 16B depicts another example of traffic.
Figure 16C:
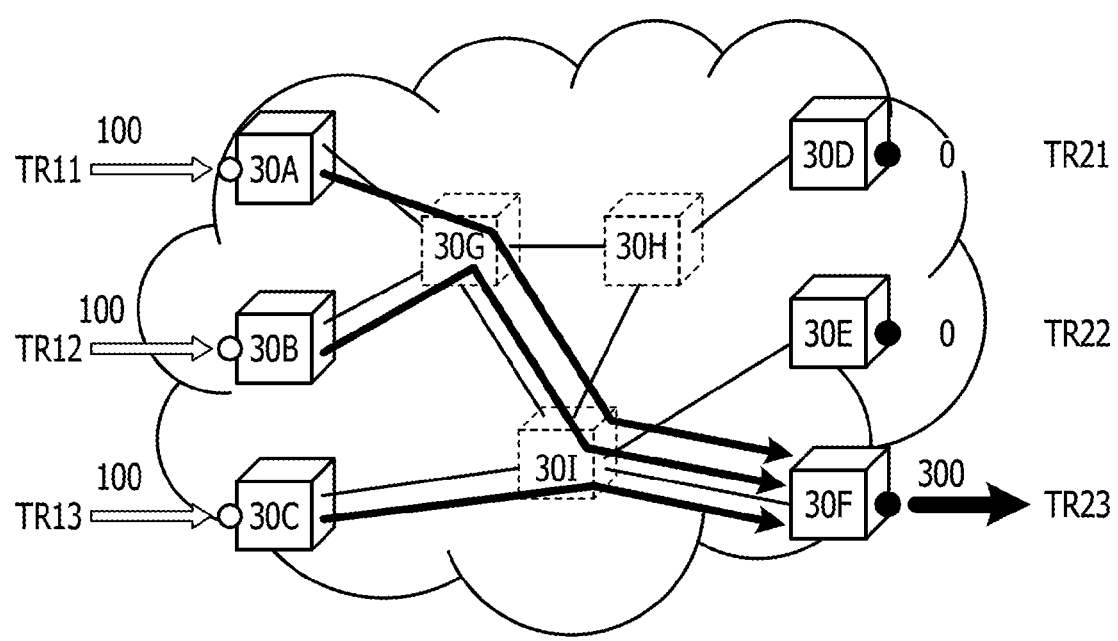
FIG. 16C depicts a further example of traffic.

FIGS. 16A to 16C depict examples of traffic. In FIGS. 16A to 16C, a case is depicted in which each of the first traffics TR11 to TR13 is 100. For example, in FIG. 16A, a pattern 1 in which all traffics including the first traffics TR11 to TR13 are transmitted from the communication apparatus 30D is depicted. Meanwhile, in FIG. 16B, a pattern 2 in which all traffics are transmitted from the communication apparatus 30E is depicted. Further, in FIG. 16C, a pattern 3 in which all traffics are transmitted from the communication apparatus 30F is depicted.

In the case of the pattern 1, as depicted in FIG. 16A, the second traffic TR21 that is the sum of all traffics is 300. On the other hand, the second traffic TR22 and the second traffic TR23 transmitted from the communication apparatus 30E and the communication apparatus 30F, respectively, are 0.

Meanwhile, in the case of the pattern 2, as depicted in FIG. 16B, the second traffic TR22 that is the sum of all traffics is 300. On the other hand, the second traffic TR21 and the second traffic TR23 transmitted from the communication apparatus 30D and the communication apparatus 30F, respectively, are 0.

Further, in the case of the pattern 3, as depicted in FIG. 16C, the second traffic TR23 that is the sum of all traffics is 300. On the other hand, the second traffic TR21 and the second traffic TR22 transmitted from the communication apparatus 30D and the communication apparatus 30E, respectively, are 0.

In such a situation, even if learning is performed by a neural network setting the first traffics TR11 to TR13 as values to the input layer and setting the second traffics TR21 to TR23 as values of the output layer, since the values of samples to be inputted to the input layer are always limited to one type of the input 1=100, input 2=100 and input 3=100, it is difficult to learn such that, as a calculation result to be outputted from the output layer in response to a sample inputted to the input layer, one of the pattern 1 of the output 1=300, output 2=0 and output 3=0, the pattern 2 of the output 1=0, output 2=300 and output 3=0 and the pattern 3 of the output 1=0, output 2=0 and output 3=300 is obtained. Further, even if the model calculates an estimation value, the error is great.

In such a case as just described, in order to cause learning to be performed appropriately such that the value of a sample to be inputted to the input layer includes many variations, some other traffic as a learning target may be added as data to the input layer.

(1) Addition of Traffic Whose Transfer Amount is Greatest

Figure 17:
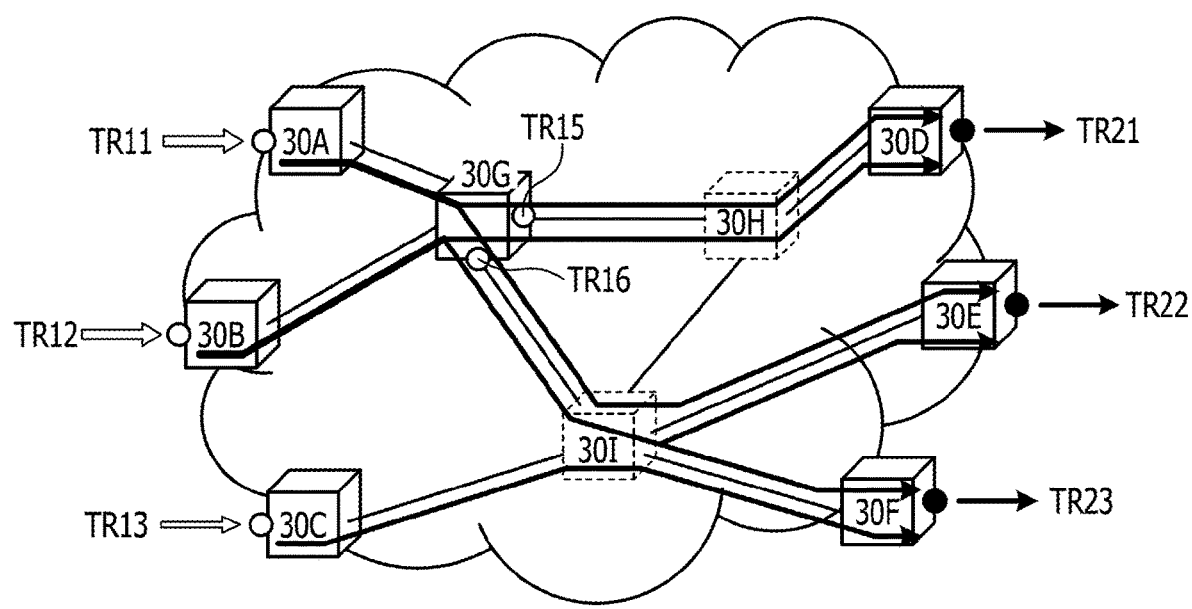
FIG. 17 depicts an example of addition of traffic.

FIG. 17 depicts an example of addition of traffic. In FIG. 17, an example is depicted in which, from among the communication apparatus 30G to 30I that are not positioned on an edge of the network NW, for example, from among the communication apparatus 30G to 30I that relay the first traffics TR11 to TR13, the communication apparatus 30G that relays a comparatively large amount of traffic in terms of the sum of the respective patterns 1 to 3 is selected. Further, in FIG. 17, an example is depicted in which the first traffic TR15 outputted from a port, from among the ports included by the communication apparatus 30G, coupled to an opposing port on the communication apparatus 30H side and the first traffic TR16 that is outputted from a port of the communication apparatus 30G coupled to an opposing port on the communication apparatus 30I side are set as a learning target and added to neurons of the input layer.

In the case where such addition of traffics is performed, the combination of the first traffic TR15 and the first traffic TR16 does not have a combination of same values but includes a different value at least in one of the respective patterns 1 to 3.

For example, in the case of the pattern 1, the first traffic TR11 received from the communication apparatus 30A and the first traffic TR12 received from the communication apparatus 30B are transferred as they are to the communication apparatus 30H. Therefore, the first traffic TR16 becomes 0 while the first traffic TR15 becomes 200. Accordingly, if the first traffic TR15 is set as input 4 and the first traffic TR16 is set as input 5, the values of the samples to be inputted to the input layer are the input 1=100, input 2=100, input 3=100, input 4=200 and input 5=0.

Meanwhile, in the case of the pattern 2, while the first traffic TR11 received from the communication apparatus 30A is transferred to the communication apparatus 30H, the first traffic TR12 received from the communication apparatus 30B is transferred to the communication apparatus 30I. Therefore, the first traffic TR15 becomes 100 while the first traffic TR16 becomes 100. Accordingly, the values of the samples to be inputted to the input layer are the input 1=100, input 2=100, input 3=100, input 4=100 and input 5=100.

On the other hand, in the case of the pattern 3, the first traffic TR11 received from the communication apparatus 30A and the first traffic TR12 received from the communication apparatus 30B are transferred as they are to the communication apparatus 30I. Therefore, the first traffic TR15 becomes 0 while the first traffic TR16 becomes 200. Accordingly, the values of the samples to be inputted to the input layer are the input 1=100, input 2=100, input 3=100, input 4=0 and input 5=200.

In this manner, also in the case where, in the patterns 1 to 3, the first traffics TR11 to TR13 have an equal value, the values of the first traffic TR15 and the first traffic TR16 differ among the patterns 1 to 3. Therefore, combinations of inputs whose values are different among the respective patterns 1 to 3 may be inputted to the input layer. Accordingly, model learning may be implemented in which, in the case where the pattern 1 is inputted to the neurons of the input layer, the output 1=300, output 2=0 and output 3=0 are outputted from the model; in the case when the pattern 2 is inputted to the neurons of the input layer, the output 1=0, output 2=300 and output 3=0 are outputted from the model; and in the case where the pattern 3 is inputted to the neurons of the input layer, the output 1=0, output 2=0 and output 3=300 are outputted.

Figure 18:
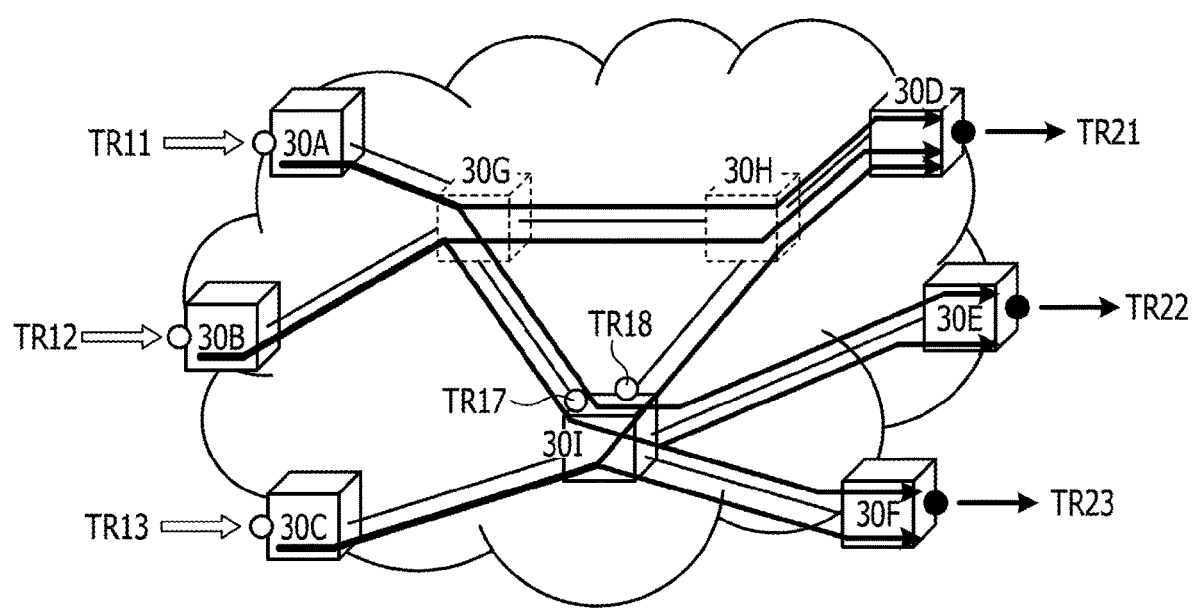
FIG. 18 depicts another example of addition of traffic.

(2) Addition of Traffic of Communication Apparatus Whose Port Number is Greatest FIG. 18 depicts another example of addition of traffic. In FIG. 18, an example is depicted in which, from among the communication apparatus 30G to 30I that are not positioned on an edge of the network NW, for example, from among the communication apparatus 30G to 30I that relay the first traffics TR11 to TR13, the communication apparatus 30I whose port number is greatest is selected. Further, in FIG. 18, an example is depicted in which first traffic TR17 received by a port, from among the ports included by the communication apparatus 30I, coupled to an opposing port on the communication apparatus 30G side and first traffic TR18 that is outputted from a port of the communication apparatus 30I coupled to an opposing port included by the communication apparatus 30H are set as a learning target and added to a neuron of the input layer.

In the case where such addition of traffics is performed, the combination of the first traffic TR17 and the first traffic TR18 does not have a combination of same values but includes a different value at least in one of the traffics among the respective patterns 1 to 3 similarly to the example depicted in FIG. 17.

Accordingly, also in the case where, in the patterns 1 to 3, the first traffics TR11 to TR13 have an equal value, the values of the first traffic TR17 and the first traffic TR18 differ among the patterns 1 to 3. Therefore, combinations of inputs whose values are different among the respective patterns 1 to 3 may be inputted to the input layer. Accordingly, model learning may be implemented in which, in the case where the pattern 1 is inputted to a neuron of the input layer, the output 1=300, output 2=0 and output 3=0 are outputted from the model; in the case when the pattern 2 is inputted to the neurons of the input layer, the output 1=0, output 2=300 and output 3=0 are outputted from the model; and in the case where the pattern 3 is inputted to the neurons of the input layer, the output 1=0, output 2=0 and output 3=300 are outputted.

(3) Deletion of Traffic Whose Transfer Amount is Comparatively Small

While an example in which a neuron of the input layer is added is described in (1) and (2) above, also it is possible to reduce the communication amount of model learning, as an example, conversely by selecting traffics transmitted and received by communication apparatus 30 positioned on an edge as a learning target and excepting, in the case where a desired degree of estimation accuracy is satisfied by performing learning, one of the traffics from the learning target within a range within which the desired degree of estimation accuracy is satisfied.

Figure 19A:
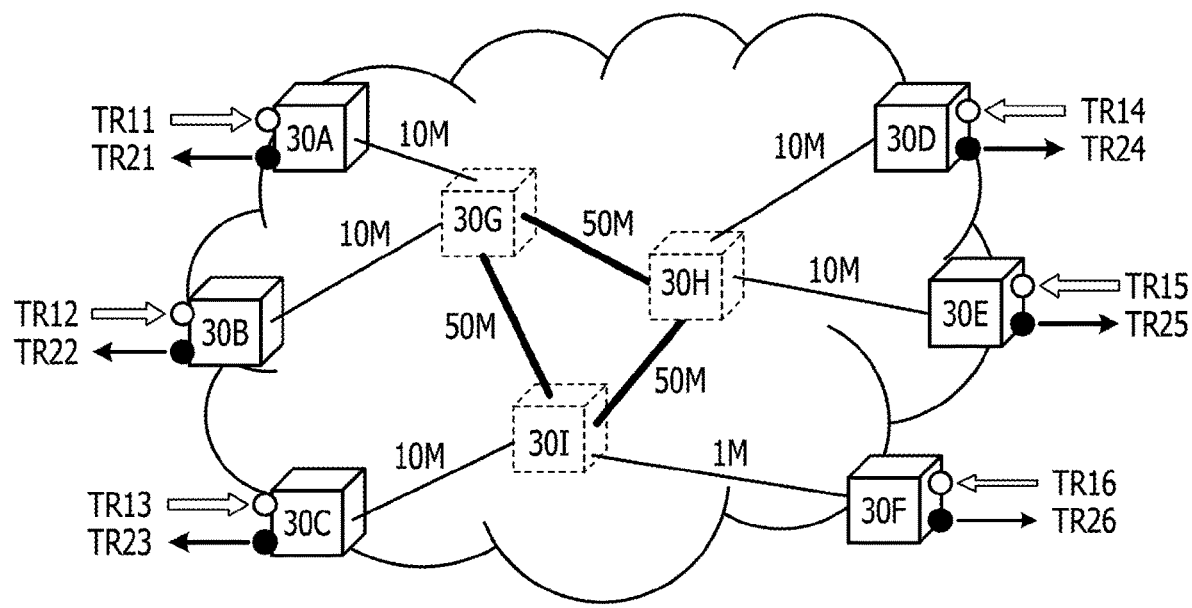
FIG. 19A depicts an example of a line speed of a link.

FIG. 19A depicts an example of a line speed of a link. In FIG. 19A, line speeds of links that couple the respective communication apparatus 30A to 30I are depicted. As depicted in FIG. 19A, the link that couples the communication apparatus 30G and 30H, which perform relay of a traffic, to each other is 50 Mbps. Meanwhile, from among the links by which the communication apparatus 30A to 30F are coupled to one of the communication apparatus 30G to 30I, five links including the link that couples the communication apparatus 30A and the communication apparatus 30G, the link that couples the communication apparatus 30B and the communication apparatus 30G, the link that couples the communication apparatus 30C and the communication apparatus 30I, the link that couples the communication apparatus 30D and the communication apparatus 30H and the link that couple the communication apparatus 30E and the communication apparatus 30H have a line speed of 10 Mbps. On the other hand, the link that couples the communication apparatus 30F and the communication apparatus 30I has a line speed of 1 Mbps.

In this manner, the first traffics TR11 to TR15 that are inputted from the outside of the network NW to the inside of the network NW through the communication apparatus 30A to 30E flow at a speed of 10 Mbps in the maximum. Also the second traffics TR21 to TR25 that are outputted from the inside of the network NW to the outside of the network NW through the communication apparatus 30A to 30E flow at a speed of 10 Mbps in the maximum.

On the other hand, the first traffic TR16 that is inputted from the outside of the network NW to the inside of the network NW through the communication apparatus 30F does not exceed the speed of 1 Mbps in the maximum, and also the second traffic TR26 that is outputted from the inside of the network NW to the outside of the network NW through the communication apparatus 30F does not exceed the speed of 1 Mbps in the maximum.

In this manner, the first traffic TR16 is very small in comparison with the first traffics TR11 to TR15, and also the second traffic TR26 is very small in comparison with the second traffics TR21 to TR25. Further, the first traffic TR16 inputted from the communication apparatus 30F is branched by being transferred in response to a destination and is individually included into the second traffics TR21 to TR26 to be outputted from the communication apparatus 30A to 30F. However, since the traffic amount is distributed in response to the destination, it decreases further.

For example, most part of the second traffics TR21 to TR26 outputted from the communication apparatus 30A to 30F are transferred by branching and/or joining of the first traffics TR11 to TR15 originally inputted to the communication apparatus 30A to 30E, and it may be considered that the degree at which the first traffic TR16 inputted from the communication apparatus 30F contributes to the traffic amounts of the second traffics TR21 to TR26 is very low.

A link whose contribution to a second traffic is low in comparison with other links may be detected, as an example, by deciding, for each of the communication apparatus 30 positioned on an edge of the network NW, whether or not the line speed of a link coupled to a communication apparatus 30 in the inside of the network NW is equal to or lower than a given ratio, for example, equal to or lower than one tenth, of a statistical value of the line speed of each link included in the network NW. It is to be noted that, for the "statistical value" here, as an example, an average value, a median, a mode or the like may be used.

Figure 19B:
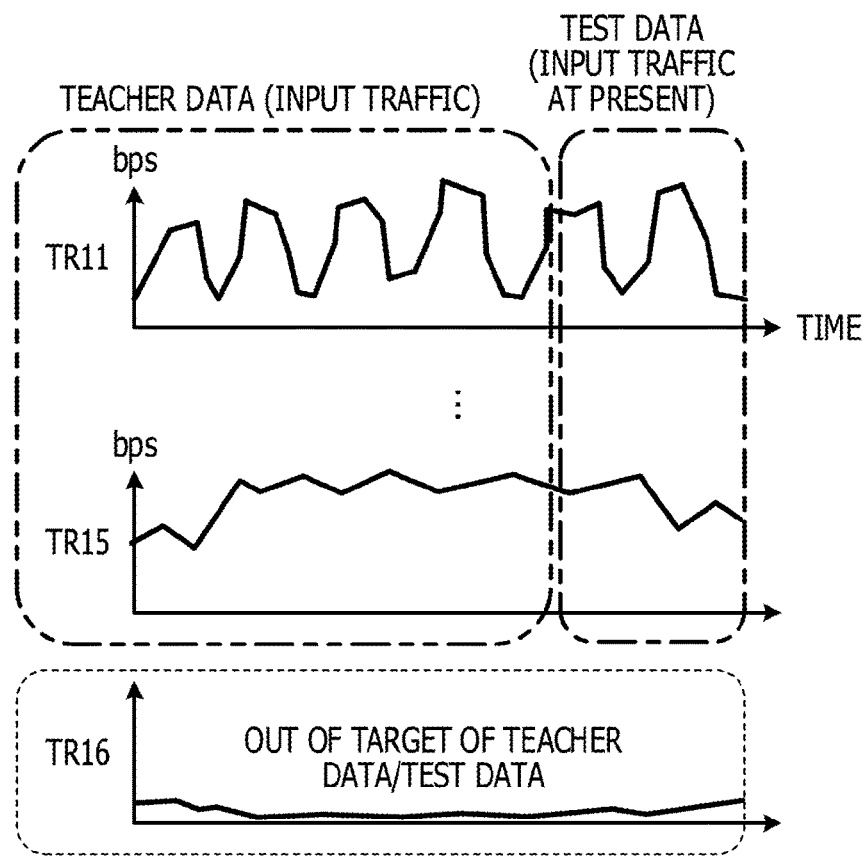
FIG. 19B depicts an example of a time variation of first traffic.
Figure 19C:
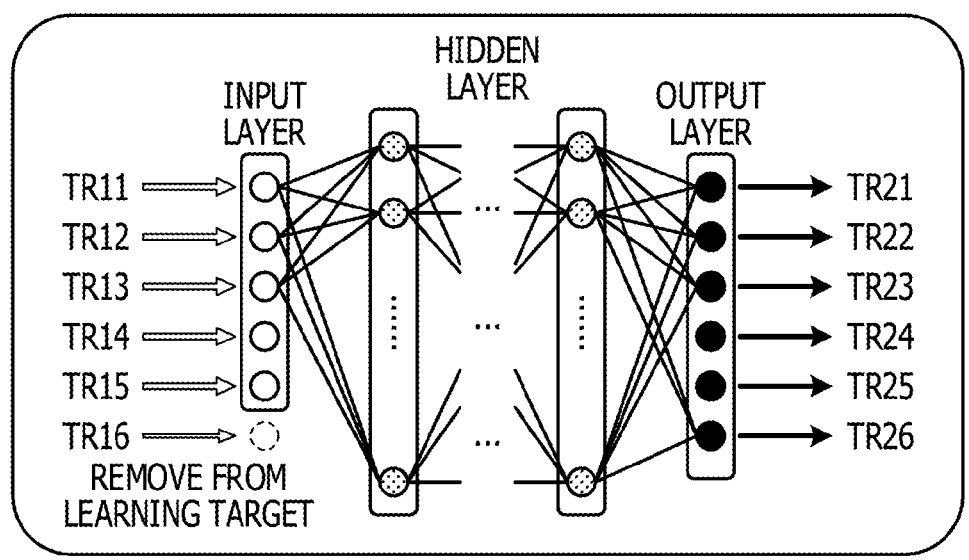
FIG. 19C depicts an example of a neural network.

Under such circumstances, the network management apparatus 10 may set the configuration of the neural network such that, as a learning target, an input regarding the first traffic TR16 to the input layer is excluded from a learning target. FIG. 19B depicts an example of a time variation of first traffic. FIG. 19C depicts an example of a neural network. As depicted in FIG. 19B, the first setting section 15c excludes a history of an actual measurement value of the first traffic TR16 inputted from a data set to the communication apparatus 30F. Further, as depicted in FIG. 19C, the first setting section 15c carries out change of a model parameter for deleting a neuron corresponding to the first traffic TR16 from the input layer.

Consequently, the learning target may be reduced while a desired degree of estimation accuracy is satisfied, and as a result, model learning may be performed by a further reduced calculation amount.

(4) Procedure of Addition and Deletion of Traffic

Figure 20:
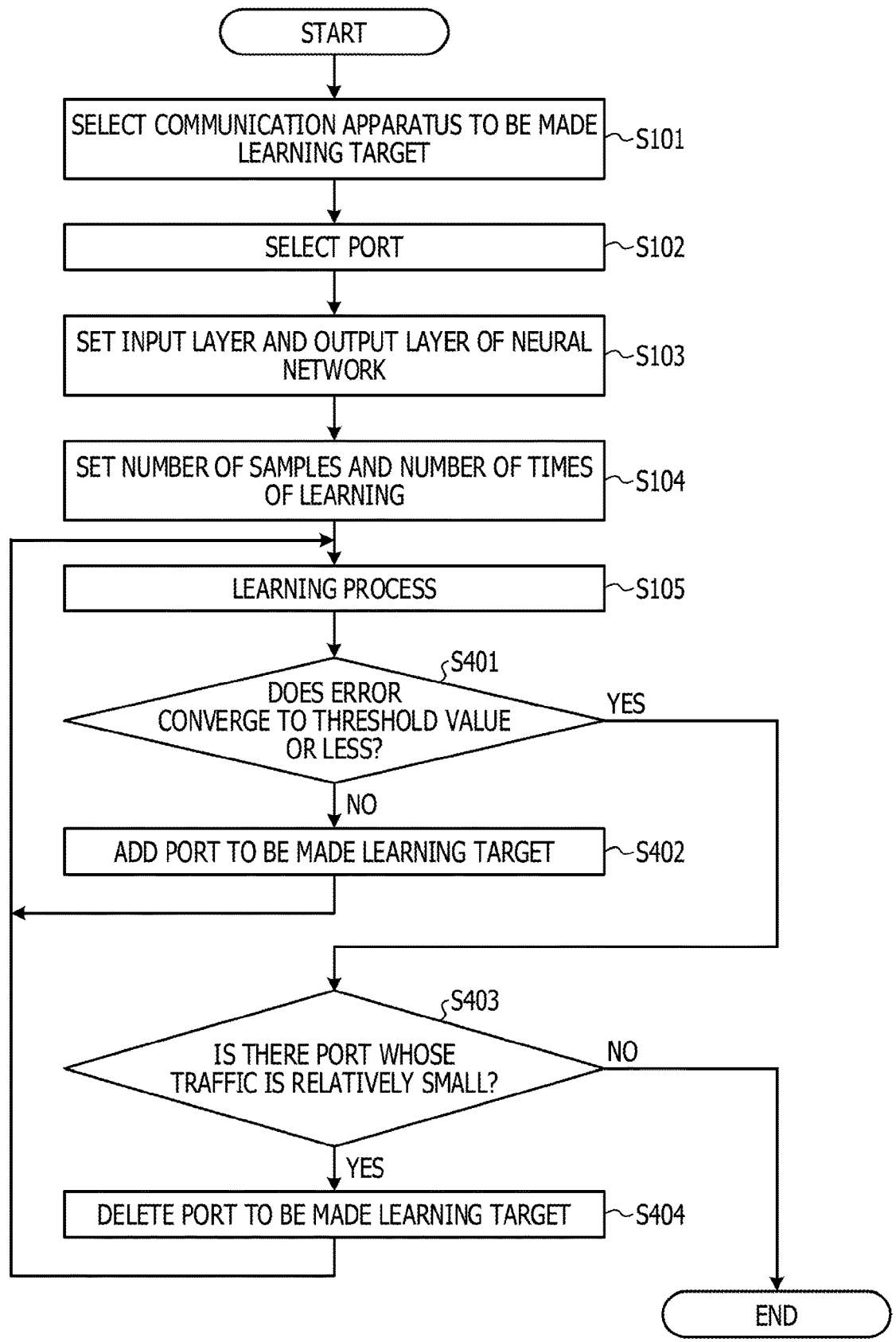
FIG. 20 depicts a procedure of a learning process according to another application example.

FIG. 20 depicts a procedure of a learning process according to another application example. Also this process is started in the case where an execution instruction of learning is accepted from the client terminal 50 or a number of histories of traffic corresponding to a given sample number are accumulated as the traffic information 13b into the storage section 13 similarly to the process depicted in FIG. 6.

As depicted in FIG. 20, the selection section 15b refers to the topology information 13a stored in the storage section 13 to select a communication apparatus 30 that is to receive a first traffic inputted from the outside of the network NW to the inside of the network NW and another communication apparatus 30 from which a second traffic to be outputted from the inside of the network NW to the outside of the network NW is to be transmitted (step S101).

Then, the selection section 15b selects a port to be used for reception of the first traffic from among ports included by the communication apparatus 30 selected as the communication apparatus 30 that is to receive the first traffic at step S101 and selects a port to be used for transmission of the second traffic from among ports included by the communication apparatus 30 selected as the communication apparatus 30 from which the second traffic is to be transmitted at step S101 (step S102).

Then, the first setting section 15c sets an input number to the input layer and an output number from the output layer of the neural network based on the number of first traffics and the number of second traffics selected at step S102 (step S103). Further, the second setting section 15d sets learning parameters such as a number of samples to be used for learning of a model and a number of times by which learning of the model is to be carried out (step S104).

Then, the learning execution section 15e executes the learning process described below for each sample included in data sets corresponding to the learning sample number set at step S104 over the learning time number set at step S104 (step S105). For example, the learning execution section 15e executes learning of a model that minimizes the error between an estimation value of the second traffic obtained by inputting an actual measurement value of the first traffic measured at the reception port for the first traffic selected at step S102 to the input layer of the model set at step S103 and an actual measurement value of the second traffic.

The learning execution section 15e decides whether or not the error converges to a level within a given threshold value as a result of the learning at step S105 (step S401). At this time, in the case where the error does not converge to a level within the given threshold value (step S401: No), the first setting section 15c executes setting change of the neural network of adding, to the input layer, a neuron that corresponds to the first traffic measured at the port included by the communication apparatus 30 at which the transfer amount is maximum described hereinabove with reference to FIG. 17 or the port included by the communication apparatus 30 whose port number is maximum described hereinabove with reference to FIG. 18 (step S402). Thereafter, the processing is advanced to step S105 to perform model learning again.

On the other hand, in the case where the error converges to a level within the given threshold value (step S401: Yes), the learning execution section 15e decides whether or not there exists a port whose contribution to the second traffic is less than the other ports (step S403). Here, in the case where a port whose contribution to the second traffic is less (step S403: Yes), the first setting section 15c executes setting change of the neural network of deleting the neuron corresponding to tie first traffic measured at the port from the input layer (step S404). Then, the processing advances to step S105.

[Forecast 1]

While the working example 1 described above exemplifies a case in which a model for estimating second traffic from an actual measurement value of first traffic is learned, also it is possible to learn a model that estimates, from an actual measurement value of first traffic, an estimation value, or for example, a forecast value, of second traffic at a point of time of the actual measurement value.

Figure 21:
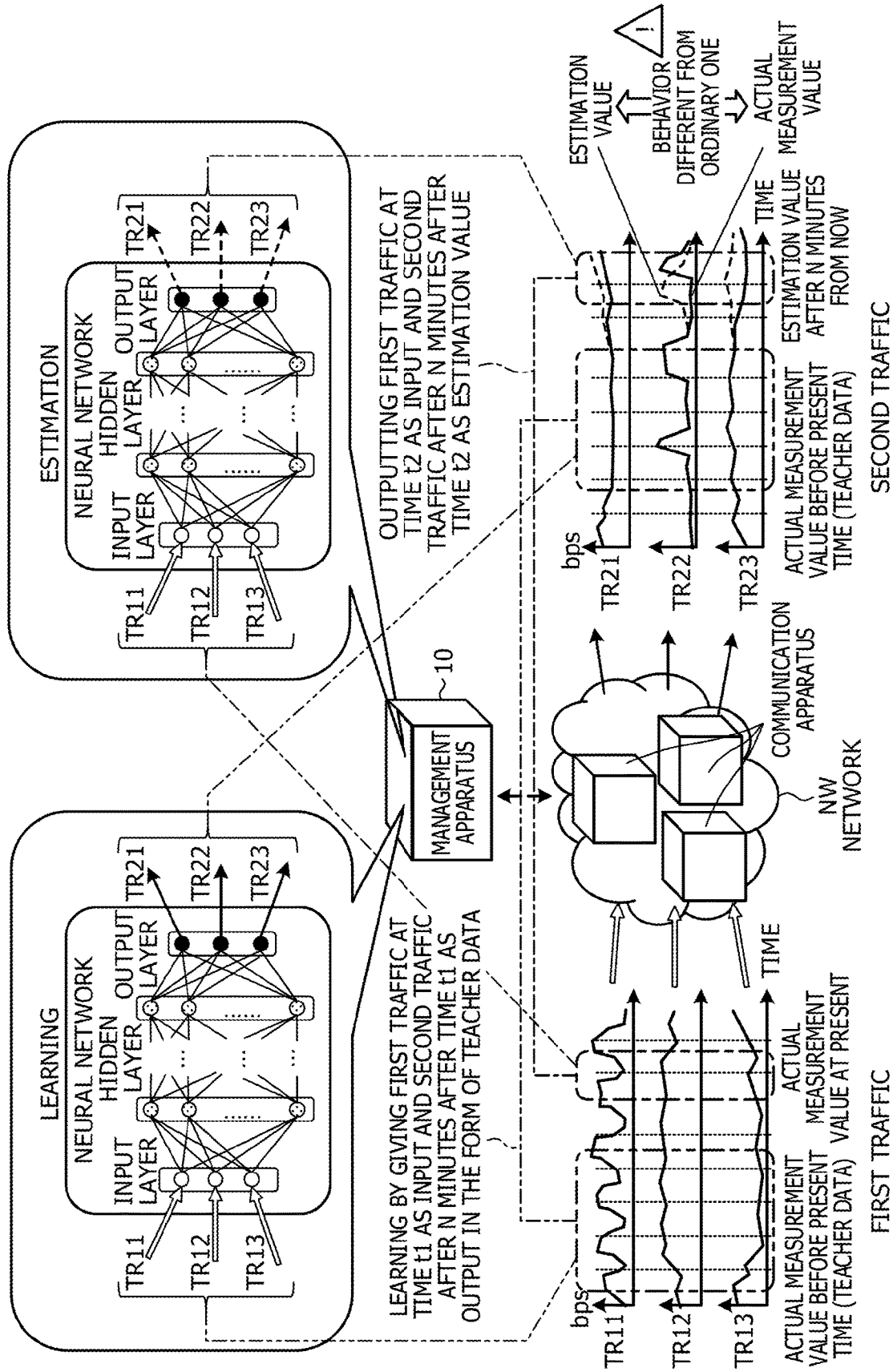
FIG. 21 depicts another example of the learning method of traffic.

FIG. 21 depicts another example of the learning method of traffic. TR11, TR12 and TR13 depicted in FIG. 21 denote first traffics that are transmitted from some end host and inputted to the network NW and then transferred in the network NW. Further, TR21, TR22 and TR23 depicted in FIG. 21 denote second traffics that are transferred in the network NW until they are finally outputted toward some end host.

Here, the network management apparatus 10 uses, as teacher data of depth learning, namely, deep learning, for which a neural network of a multilayer structure is used, histories of actual measurement values of first traffics TR11 to TR13 and actual measurement values of second traffics TR21 to TR23 at different timings similarly as in the working example 1 described hereinabove. However, the network management apparatus 10 is different from that in the working example 1 in that, as output data to be outputted from the output layer, prediction values of the second traffics TR21 to TR23 after a given period of time after the point of time at which the first traffics TR11 to TR13 are measured are estimated.

For example, in the case where a stochastic gradient descent method is used, the network management apparatus 10 uses a history of actual measurement values of the first traffics TR11 to TR13 at certain time t1 and actual measurement values of the second traffics TR21 to TR23 at time t2 after a given period of time, for example, after N minutes, from time t1 as one sample. For example, the network management apparatus 10 estimates the second traffics TR21 to TR23 at time t2 by inputting actual measurement values of the first traffics TR11, TR12 and TR13 to the input layer of the model of the neural network. Then, the network management apparatus 10 executes learning of a model that minimizes the error between the estimation values of the second traffics TR21 to TR23 outputted from the model and actual measurement values of the second traffics TR21 to TR23 at time t2.

After model learning of the neural network is executed in this manner, the network management apparatus 10 inputs the values of the first traffics TR11 to TR13 at present to the input layer with respect to the neural network for which the optimization of weighting coefficients has been performed by the model learning, whereupon a calculation result of the second traffics TR21 to TR23 after N minutes to be outputted from the output layer of the model is obtained. This calculation result may be regarded as estimation values of the second traffics TR21 to TR23 after N seconds estimated based on the ordinary behavior.

Thereafter, every time estimation values of the second traffics TR21 to TR23 are obtained as a calculation result, the network management apparatus 10 compares the estimation values of the second traffics TR21 to TR23 and actual measurement values of the second traffics TR21 to TR23 measured after N minutes after time t1 by the communication apparatus 30 of the network NW with each other. Also it is possible for the network management apparatus 10 to compare prediction values of the second traffics TR21 to TR23 after N minutes with a given threshold value. This makes it possible to detect whether or not there is some abnormality in traffic outputted from the network NW at time t2 that is N minutes after time t1 that is the time at present. Then, in the case where the prediction values of the second traffics TR21 to TR23 after N minutes exceed the threshold value, the network management apparatus 10 may output an alert to the client terminal 50.

In this manner, the network management apparatus 10 may forecast the behavior of traffic to be outputted from the inside of the network NW to the outside of the network NW. It is to be noted that naturally the network management apparatus 10 estimates the first traffics TR11 to TR13 at time t2 that is N minutes later than time t1 by inputting actual measurement values of the second traffics TR21, TR22 and TR23 at time t1 to the input layer of the model of the neural network. This makes it possible for the network management apparatus 10 to execute learning of a model that minimizes the error between actual measurement values of the first traffics TR11 to TR13 after N minutes outputted from the model and actual measurement values of the first traffics TR11 to TR13 at time t2. Consequently, in the case where the prediction values of the first traffics TR11 to TR13 after N minutes exceed the threshold value, the network management apparatus 10 may output an alert to the client terminal 50. In this manner, also it is possible to forecast the behavior of traffic to be inputted from the outside of the network NW to the inside of the network NW.

<Modifications>

Figure 22:
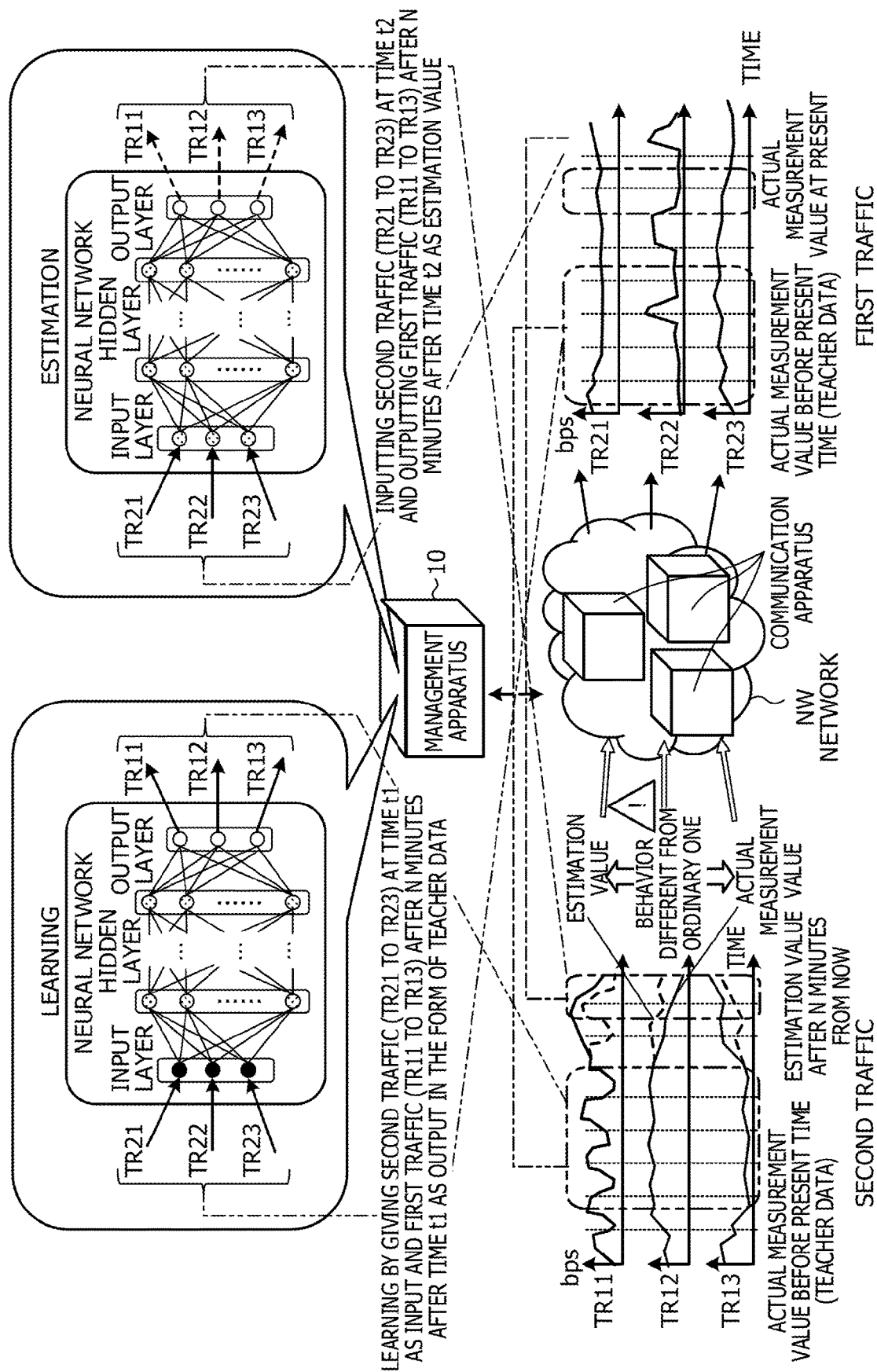
FIG. 22 depicts a further example of the learning method of traffic.

FIG. 22 depicts a further example of the learning method of traffic. As exemplified in FIG. 22, the network management apparatus 10 may be configured such that it estimates first traffics (TR11 to TR13) at time t2 N minutes after time t1 by inputting actual measurement values of second traffics (TR21, TR22 and TR23) at time t1 to the input layer of a model of a neural network. In this case, the network management apparatus 10 may execute learning of a model that minimizes the error between prediction values outputted from the model (for example, estimation values indicative of the first traffics (TR11 to TR13) after N minutes) and actual measurement values of the first traffics (TR11 to TR13) at time t2. By performing a decision regarding whether or not the prediction values of the first traffics (TR11 to TR13) after N minutes exceed a threshold value, it is possible to detect, before an event that the actual measurement values of the first traffic (TR11 to TR13) exceed the threshold value actually occurs, a presage of the event. In the case where the network management apparatus 10 decides that the prediction values of the first traffics (TR11 to TR13) after N minutes exceed the threshold value, it may output an alert to the client terminal 50. In this manner, also it is possible to forecast the behavior of traffic from the outside of the network NW to the inside of the network NW.

The second traffics (TR21, TR22 and TR23) described above include an aspect as an example of traffic outputted (transmitted) from the inside of the network NW to the outside of the network NW. The first traffics (TR11 to TR13) include an aspect as an example of traffic inputted (received) from the outside of the network NW to the inside of the network NW.

[Isolation of Variation Cause of Output Traffic in Modification]

By combining forecast of the behavior of traffic to be inputted from the outside of the network NW to the inside of the network NW and forecast of the behavior of traffic to be outputted from the inside of the network NW to the outside of the network NW described above, it is possible to isolate whether some variation (for example, a failure of a communication apparatus) occurs in the network NW or the behavior of input traffic inputted to the inside of the network NW varies.

Figure 23:
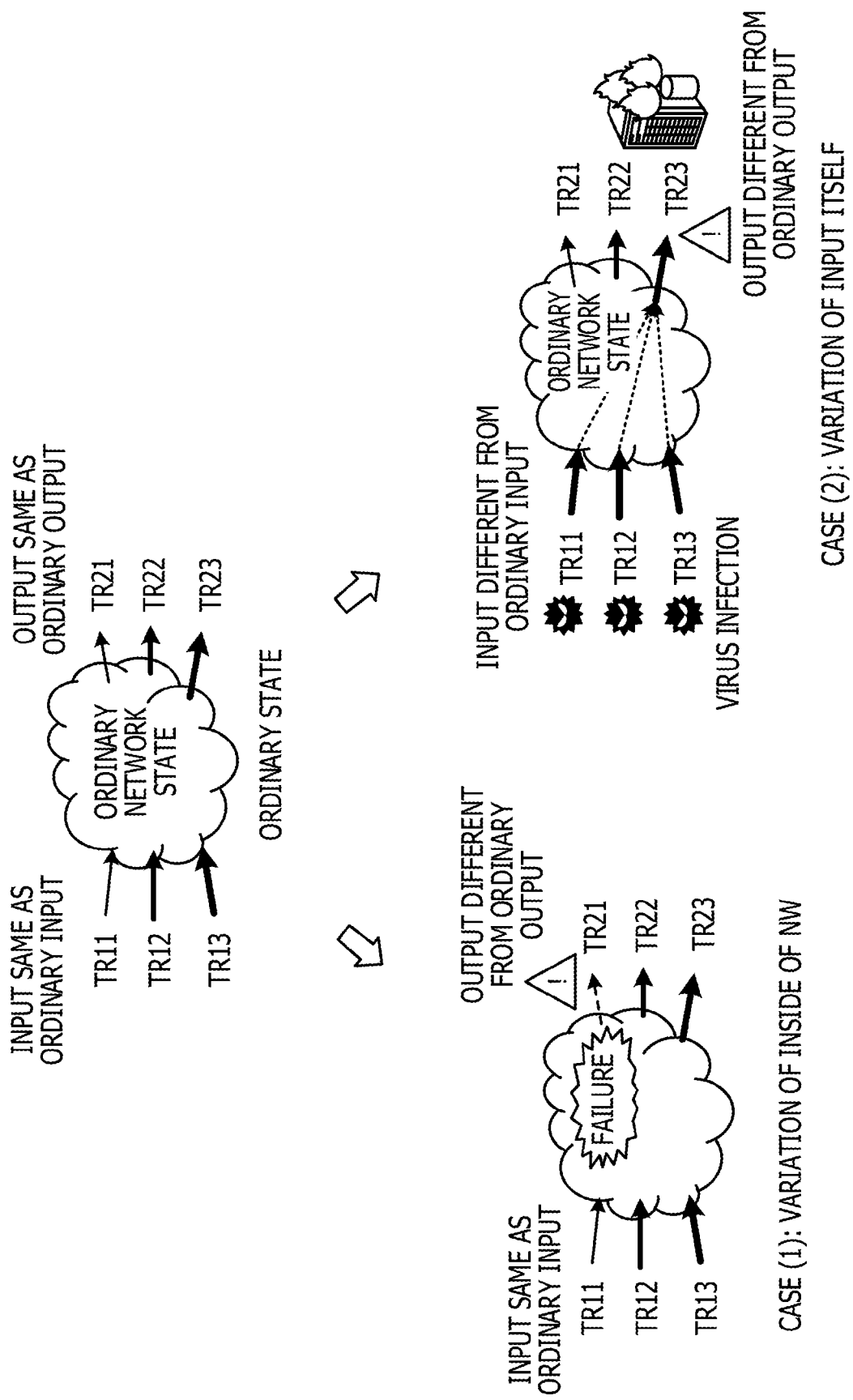
FIG. 23 depicts an example of a case in which behavior of traffic outputted from the inside of a network to the outside of the network varies and a possible cause.

FIG. 23 depicts an example of a case in which behavior of traffic outputted from the inside of a network to the outside of the network varies and a possible cause. In an ordinary state, for example, in the case where a failure does not occur in the network NW and also the input traffics (TR11 to TR13) indicate a same behavior as an ordinary behavior, it may be estimated that forecast values and actual measurement values of the output traffics (TR21 to TR23) estimated by the learned model of the neural network have close values and also the output traffics (TR21 to TR23) indicate a same behavior as an ordinary behavior.

On the other hand, in the case where the differences between forecast values and actual measurement values of the output traffics TR21 to TR23 exceed a threshold value, for example, in the case where the output traffics indicate a different behavior from an ordinary behavior, it is supposed that roughly two cases have occurred as a cause.

As one case, a case (case (1) in FIG. 23) is supposed in which, since, as an example, some failure occurs in a communication apparatus, a link or the like in the network NW, although the input traffics TR11 to TR13 are inputted in a behavior same as an ordinary behavior to the inside of the network NW, the output traffics TR21 to TR23 indicate actual measurement values that have not been learned as yet due to an influence of delay, congestion, packet discarding or the like inside of the network NW until the difference of them from forecast values estimated as an ordinary behavior exceeds the threshold value.

As the other case, a case (case (2) in FIG. 23) is supposed in which, although the inside of the network NW does not particularly suffer from a failure or the like and is in a situation same as an ordinary situation, since the input traffics TR11 to TR13 indicate actual measurement values that have not been learned as yet, for example, due to occurrence of excessive communication by virus infection of a host apparatus coupled to the network NW, access concentration upon a distribution server by distribution of a security patch of high urgency or start of version-up of an operating system or the like and also estimation values of the output traffics TR21 to TR23 obtained based on the input traffics indicate unknown values, the differences from actual measurement values of the output traffics TR21 to TR23 exceed a threshold value.

Since the part or the method for investigation or countermeasure performed by a network operator differs between the case (1) and the case (2) exemplified in FIG. 23, if the network management apparatus performs isolation of a cause in regard to which one of the situations of the case (1) and the case (2) may occur with a higher degree of possibility and presents an alert to the network operator, this may make use of assistance in decision of the network operator, reduction of the countermeasure time and so forth.

Figure 24:
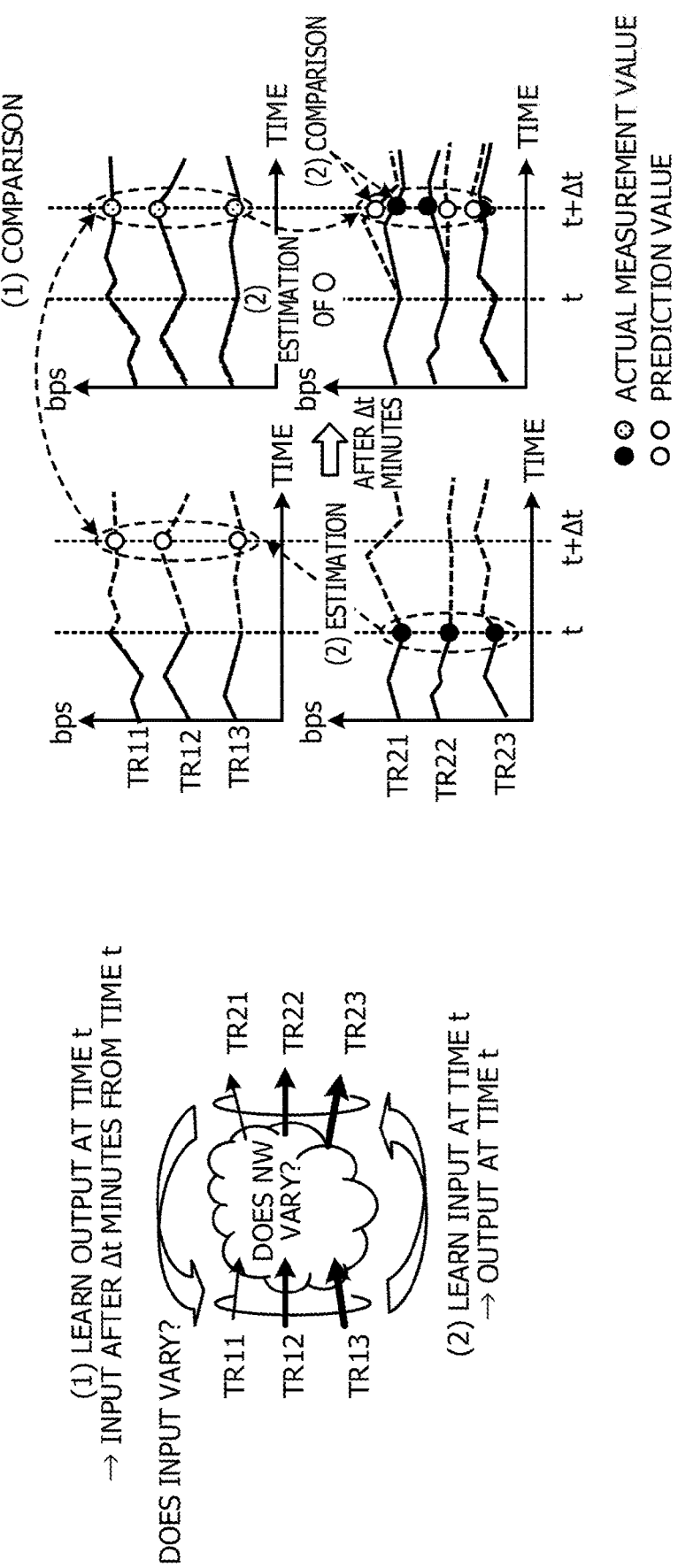
FIG. 24 schematically depicts an example of a method for isolating a case (1) and a case (2) regarding a variation of a traffic behavior from each other.

FIG. 24 schematically depicts an example of a method for isolating a case (1) and a case (2) regarding a variation of a traffic behavior from each other. In the exemplification of FIG. 24, a first learning model for confirming whether or not the behavior of the input traffics TR11 to TR13 is same as an ordinary behavior and a second learning model for confirming whether or not the behavior of the output traffics TR21 to TR23 with respect to the input traffics TR11 to TR13 is same as an ordinary behavior are each learned.

In the first learning model, as the teacher data, the output traffics TR21 to TR23 are set, as the second traffic, to the input layer of the model of the neural network, and the input traffics TR11 to TR13 after lapse of a given period of time, for example, $\Delta t$, after the time of measurement of the output traffics TR21 to TR23 are set, as the second traffic, to the output layer of the model of the neural network to perform learning.

Using this first learning model, it is possible to obtain estimation values (○ of TR11 to TR13 at time t+$\Delta t$ in FIG. 24) by forecast of the input traffics TR11 to TR13 at time t+$\Delta t$ based on actual measurement values (• of TR21 to TR23 at time tin FIG. 24) of the output traffics TR21 to TR23 at certain time t.

Further, after lapse of time $\Delta t$, the estimation values of input traffics TR11 to TR13 forecasted at the point of time of time t (○ of TR11 to TR13 at time t+$\Delta t$ in FIG. 24) and the actual measurement values of input traffics TR11 to TR13 that is obtained by getting the time t+$\Delta t$ (• of TR11 to TR13 at time t+$\Delta t$ in FIG. 24) are compared with each other. Thus, if the difference of a result of the comparison does not exceed the threshold value, it may be estimated that the behavior of the input traffics TR11 to TR13 is same as an ordinary behavior estimated at the point of time of time t, but if the difference exceeds the threshold value, it may be estimated that the behavior of the input traffics TR11 to TR13 is not the ordinary behavior estimated at the point of time of time t, for example, a variation of the behavior different from the ordinary behavior occurs with the input traffics TR11 to TR13 themselves.

In the second learning model, as the teacher data, the input traffics TR11 to TR13 as the first traffic are set to the input layer of the model of the neural network and, as the second traffic, the output traffics TR21 to TR23 at time same as the measurement time of the input traffics TR11 to TR13 are set to the output layer of the model of the neural network to perform learning.

Using the second learning model, it is possible to obtain estimation values (○ of TR21 to TR23 at time t+$\Delta t$ in FIG. 24) by forecast at present of the output traffics TR21 to TR23 at time t+$\Delta t$ based on actual measurement values (• of TR11 to TR13 at time t+$\Delta t$ in FIG. 24) of the input traffics TR11 to TR13 at certain time t+$\Delta t$.

Further, the estimation values (○ of TR21 to TR23 at time t+$\Delta t$ in FIG. 24) and the actual measurement values (• of TR21 to TR23 at time t+$\Delta t$ in FIG. 24) of the output traffics TR21 to TR23 at time t+$\Delta t$ are compared with each other. Thus, if the difference of a result of the comparison does not exceed the threshold value, it may be estimated that the behavior of the output traffics TR21 to TR23 is same as the estimated ordinary behavior, but if the difference exceeds the threshold value, it may be estimated that the behavior of the output traffics TR21 to TR23 is not the ordinary behavior.

The decision (that may be called also isolation process) based on the two estimation values makes it possible to isolate whether the inside of the network NW is varied by a failure or the like as in the case (1) described hereinabove or the input traffic itself inputted to the network NW has varied as in the case (2).

Figure 25:
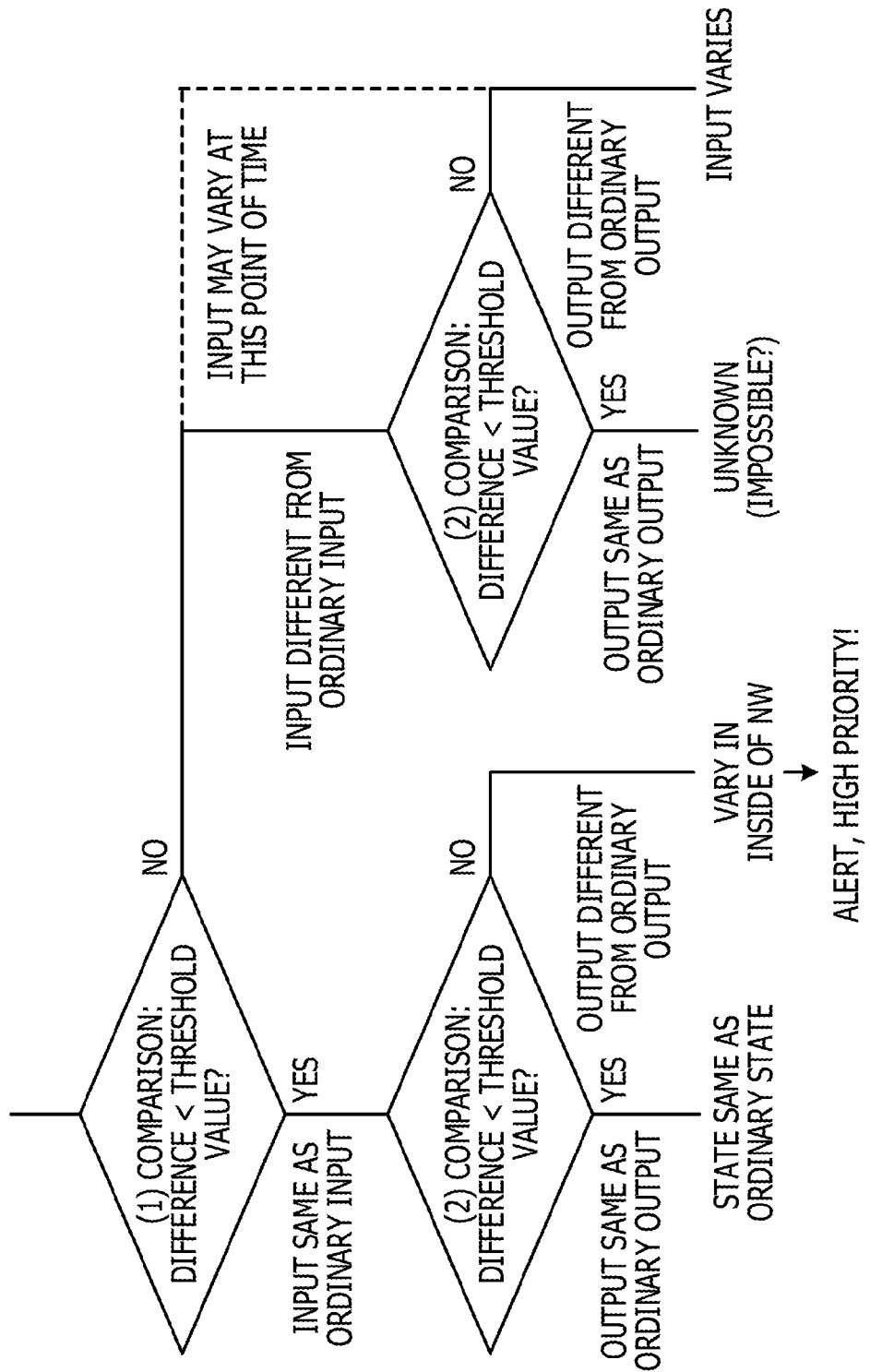
FIG. 25 depicts an example of a flow chart for an isolation process of a case regarding a variation of output traffic.

FIG. 25 depicts an example of a flow chart for an isolation process of a case regarding a variation of output traffic. First, in the case where the result of comparison between estimation and actual measurement values by the first learning model indicates that the behavior of the input traffic is same as an ordinary behavior (Y by the (1) comparison) and a result of comparison between estimation and actual measurement values by the second learning model indicates that also the behavior of the output traffic is same as an ordinary behavior (Y by the (2) comparison), it may be supposed that the network NW and the input traffic are in a situation same as an ordinary situation and there is no particular problem as depicted in FIG. 23 as ordinary state.

However, in the case where, although the result of comparison between estimation and actual measurement values by the first learning model indicates that the behavior of the input traffic is same as an ordinary behavior (Y by the (1) comparison), the result of comparison between estimation and actual measurement values by the second learning model indicates that the behavior of the output traffic is different from an ordinary behavior (N by the (2) comparison), it may be supposed that some variation such as a failure occurs in the inside of the network NW as in the case (1) described above.

On the other hand, in the case where the result of comparison between estimation and actual measurement values by the first learning model indicates that the behavior of the input traffic is different from an ordinary behavior (N by the (1) comparison) and also the result of comparison between estimation and actual measurement values by the second learning model indicates that also the behavior of the output traffic is different from an ordinary behavior (N by the (2) comparison), it may be supposed that some variation such as a failure occurs in the input traffic inputted to the network NW as in the case (2) described above.

It is to be noted that such a situation is less likely to occur that, although the result of comparison between estimation and actual measurement values by the first learning model indicates that the behavior of the input traffic is different from an ordinary behavior (N by the (1) comparison), the result of comparison between estimation and actual measurement values by the second learning model indicates that the behavior of the output traffic is same as an ordinary behavior (Y by the (2) comparison). However, in the case where the decisions indicate such results as described above, it may be supposed that some exceptional situation occurs as an unknown case. This may possibly be a situation in which some failure occurs with measurement of input or output traffic or storage of an actual measurement value, which makes data of traffic values improper, resulting in failure in correct estimation or comparison.

Figure 26:
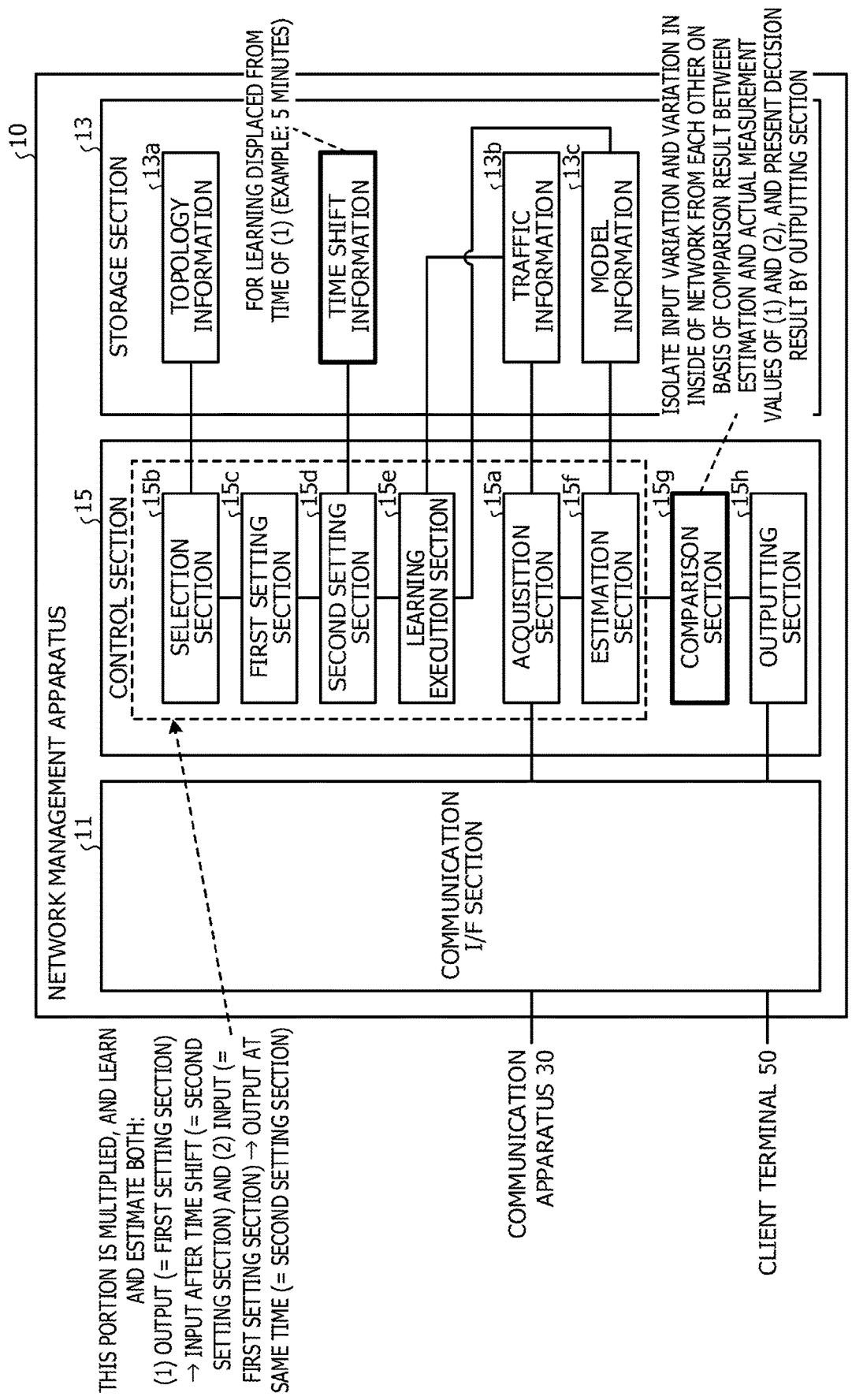
FIG. 26 depicts an example of a functional block configuration of a network management apparatus configured so as to perform isolation of a variation cause of output traffic.

FIG. 26 depicts an example of a functional block configuration of a network management apparatus configured so as to perform isolation of a variation cause of output traffic. The network management apparatus exemplified in FIG. 26 is the same in basic configuration as the exemplification of FIG. 5.

In order to perform two kinds of learning as described above, the control section 15 of the network management apparatus of FIG. 26 includes a plurality of selection sections 15b, first setting sections 15c, second setting sections 15d, learning execution sections 15e, acquisition sections 15a and estimation sections 15f for the respective first and second kinds of learning.

In the first learning, output traffic is set to the first setting section 15c, and input traffic after lapse of a given period of time is set to the second setting section 15d, individually. It is to be noted that the given period of time is statically set or dynamically set through an inputting apparatus or a network and retained as time shift information into the storage section 13.

In the second learning, input traffic is set to the first setting section 15c, and output traffic at the same timing is set to the second setting section 15d, individually.

Further, the comparison section 15g performs a decision based on the flow chart of FIG. 25 using an actual measurement value of output traffic by the acquisition section 15a and an estimation value of input traffic after lapse of a given period of time by the estimation section 15f in the first learning as well as an actual measurement value of input traffic by the acquisition section 15a and an estimation value of output traffic at the same timing by the estimation section 15f in the second learning, and outputs a result of the decision through the outputting section 15h.

[Various Aspects of Modifications]

According to one aspect of the modifications described above, the network management apparatus includes a memory configured to store a model for estimation of second traffic based on first traffic of a network that includes a plurality of communication apparatus, and a processor coupled to the memory and configured to execute an analysis process. In the analysis process, the processor of the network management apparatus is configured to execute an acquisition process that includes acquiring an actual measurement value of the first traffic and execute a comparison process that includes comparing an estimation value of the second traffic and a given value. Here, the estimation value of the second traffic may be estimated by inputting the actual measurement value of the first traffic acquired by the acquisition process to the model stored in the memory.

According to another aspect of the modifications described above, the first traffic may be traffic that is outputted from the inside of the network to the outside of the network, and the second traffic may be traffic that is inputted from the outside of the network to the inside of the network.

According to a further aspect of the modifications, the model stored in the memory of the network management apparatus is configured to estimate, based on the first traffic, the second traffic after a given period of time after the first traffic is measured.

According to a still further aspect of the modifications, the processor of the network management apparatus may further acquire an actual measurement value of the second traffic and compare the estimation value of the second traffic and the actual measurement value of the second traffic acquired by the acquisition process.

According to a yet further aspect, the memory of the network management apparatus is further configured to store a second model for estimation of the first traffic based on the second traffic. The processor of the network management apparatus acquires, in the acquisition process, the actual measurement value of the first traffic and the actual measurement value of the second traffic. The processor of the network management apparatus is configured to execute the comparison process that includes a first comparison process and a second comparison process. In the first comparison process, the processor compares the estimation value of the second traffic and the actual measurement value of the second traffic acquired by the acquisition process, wherein the estimation value of the second traffic is estimated by inputting the actual measurement value of the first traffic to the model. In the second comparison process, the processor compares the estimation value of the first traffic and the actual measurement value of the first traffic acquired by the acquisition process, wherein the first traffic is estimated by inputting the actual measurement value of the second traffic acquired by the acquisition process to the second model.

According to an additional aspect, the processor of the network management apparatus may execute an outputting process. In the outputting process, the processor may output an alert when a difference between the estimation value of the first traffic and the actual measurement value of the first traffic is equal to or higher than a given threshold value or when a difference between an estimation value of the second traffic after the given period of time elapses and an actual measurement value of the second traffic after the given period of time elapses is equal to or higher than a given threshold value.

According to another additional aspect, the processor of the network management apparatus may execute a first outputting process and a second outputting process in the outputting process. In the first outputting process, the processor may output, where the difference between the estimation value of the first traffic and the actual measurement value of the first traffic is equal to or higher than the given threshold value, a first alert when the difference between the estimation value of the second traffic after the given period of time elapses and the actual measurement value of the second traffic after the given period of time elapses is equal to or higher than the given threshold value. In the second outputting process, the processor may output a second alert when the difference between the estimation value of the second traffic after the given period of time elapses and the actual measurement value of the second traffic after the given period of time elapses is lower than the given threshold value.

[Disintegration and Integration]

The respective components of the respective pieces of apparatus depicted in the drawings may not necessarily be physically configured in such a manner as depicted. For example, particular forms of disintegration and integration of the apparatus depicted in the drawings are merely examples. The all or part of them may be functionally or physically disintegrated or integrated in an arbitrary unit in response to various loads, situations of use and so forth. For example, the acquisition section 15a, selection section 15b, first setting section 15c, second setting section 15d, learning execution section 15e, estimation section 15f, comparison section 15g or outputting section 15h may be coupled as an external apparatus of the network management apparatus 10 through a network. Otherwise, the acquisition section 15a, selection section 15b, first setting section 15c, second setting section 15d, learning execution section 15e, estimation section 15f, comparison section 15g or outputting section 15h may be provided in separate apparatus from each other and are coupled to each other by a network to cooperate with each other, thereby to implement the functions of the network management apparatus 10 described above. Further, all or part of the topology information 13a, traffic information 13b or model information 13c stored in the storage section 13 may be provided by separate apparatus from each other and are coupled to each other by a network to cooperate with each other, thereby to implement the functions of the network management apparatus 10 described above.

[Management Program]

The various processes described hereinabove in the description of the working examples may be implemented by a program prepared in advance and executed by a computer such as a personal computer or a work station. Therefore, in the following, an example of a computer that executes a management program having functions similar to those of the working examples described above is described with reference to FIG. 27.

Figure 27:
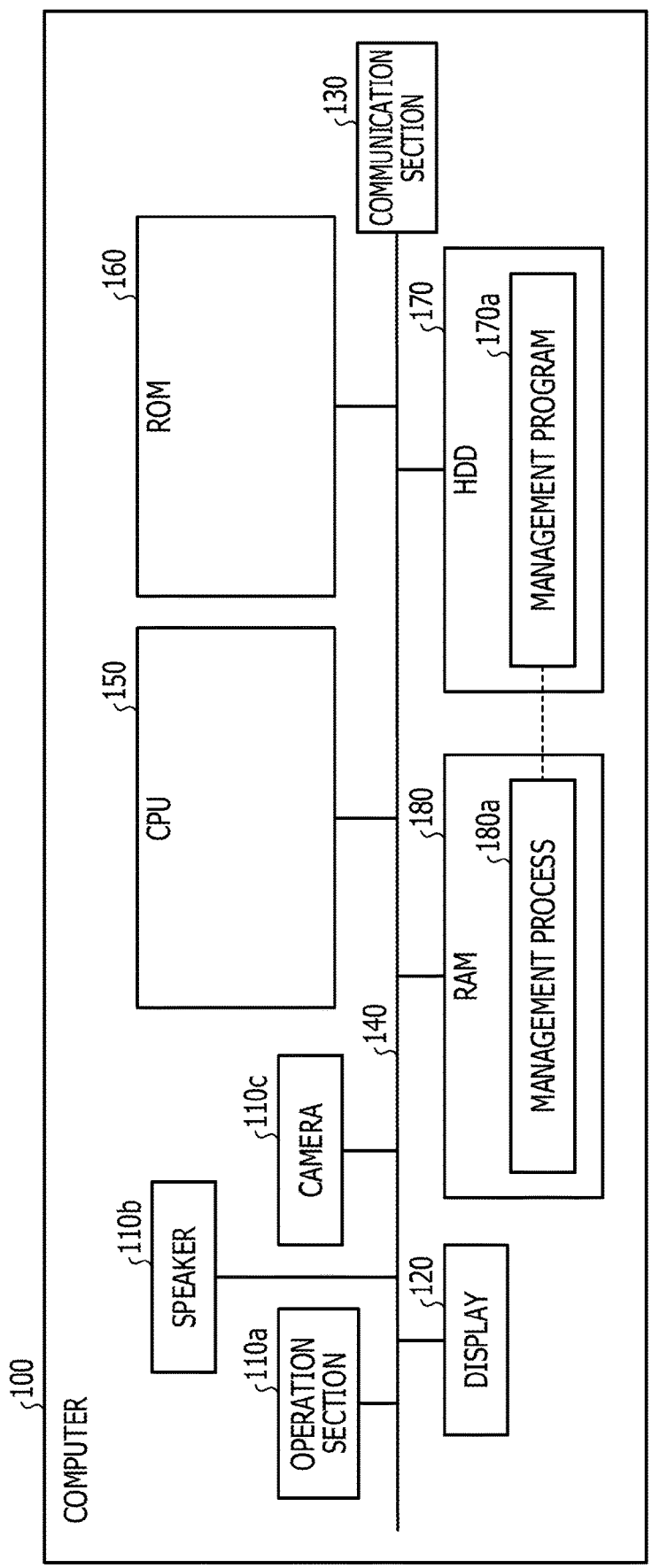
FIG. 27 depicts an example of a hardware configuration of a computer that executes a management program.

FIG. 27 depicts an example of a hardware configuration of a computer that executes a management program. As depicted in FIG. 27, the computer 100 includes an operation section 110a, a speaker 110b, a camera 110c, a display 120 and a communication section 130. The computer 100 further includes a CPU 150, a read only memory (ROM) 160, an HDD 170 and a RAM 180. The respective components 110 to 180 are coupled to each other through a bus 140.

In the HDD 170, as depicted in FIG. 27, a management program 170a is stored which exhibits functions similar to those of the acquisition section 15a, selection section 15b, first setting section 15c, second setting section 15d, learning execution section 15e, estimation section 15f, comparison section 15g and outputting section 15h described hereinabove in coupling with the working example 1. The management program 170a may be subject to integration or disintegration of components similarly to the respective components of the acquisition section 15a, selection section 15b, first setting section 15c, second setting section 15d, learning execution section 15e, estimation section 15f, comparison section 15g and outputting section 15h. For example, all data indicated in the working example 1 described hereinabove may not necessarily be stored in the HDD 170, but data to be used for processing may be stored in the HDD 170.

Under such an environment as just described, the CPU 150 reads out the management program 170a from the HDD 170 and deploys the management program 170a into the RAM 180. As a result, the management program 170a functions as a management process 180a as depicted in FIG. 27. This management process 180a deploys various kinds of data read out from the HDD 170 into a region allocated to the management process 180a from within the storage region the RAM 180 includes and uses the deployed various kinds of data to execute various processes. For example, as an example of the process executed by the management process 180a, processes depicted in FIG. 6, 7, 13, 20 or 25 are included. It is to be noted that the CPU 150 may not operate as all of the processing sections described hereinabove in coupling with the working example 1, but may virtually implement a processing section corresponding to a process that is made an execution target.

It is to be noted that the management program 170a described above may not necessarily be stored in the HDD 170 or the ROM 160 from the beginning. The management program 170a is stored, for example, into a "portable physical medium" inserted in the computer 100 such as a flexible disk, namely, a floppy disk (FD), a compact disk-read only memory (CD-ROM), a digital versatile disk (DVD), a magneto-optical disk, or an integrated circuit (IC) card. Then, the computer 100 may acquire the management program 170a from such portable physical medium and execute the management program 170a. Alternatively, the management program 170a may be stored into a different computer, a server apparatus or the like coupled to the computer 100 through a public network, the Internet, a LAN, a wide area network (WAN) or the like such that the computer 100 acquires the management program 170a from the different computer, server apparatus or the like and execute the management program 170a.

All examples and conditional language recited herein of the radio frequency identifier (RFID) tag and the high frequency circuit are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A management apparatus, comprising:
  a memory configured to store a first estimation model of a first network and a second estimation model of the first network, the first estimation model being configured to output an estimation value of an incoming traffic by using a measurement value of an outgoing traffic as a input data, the second estimation model being configured to output an estimation value of the outgoing traffic by using a measurement value of the incoming traffic as a input data, the incoming traffic indicating a traffic inputted from a second network to the first network, the outgoing traffic indicating a traffic to be outputted from the first network to the second network; and
  a processor coupled to the memory, the processor being configured to:
  execute, for each of a plurality of communication apparatuses in the first network, a first measurement process that includes obtaining a first measurement value of the outgoing traffic from the first network to the second network during a first time period;
  execute, for each of the plurality of communication apparatuses in the first network, a first estimation process that including obtaining a first estimation value of the incoming traffic from the second network to the first network by using the first estimation model with an input of the first measurement value of the outgoing traffic from the first network to the second network;

execute, for each of the plurality of communication apparatuses in the first network, a second measurement process that includes obtaining a second measurement value of the incoming traffic from the second network to the first network during a second time period after the first time period;

execute, for each of the plurality of communication apparatuses in the first network, a first comparison process that includes outputting a first comparison result by comparing a first difference value with a first threshold, the first difference value being a difference between the first estimation value of the incoming traffic obtained in the first estimation process and the second measurement value of the incoming traffic obtained in the second measurement process;

execute, for each of the plurality of communication apparatuses in the first network, a first output process that includes outputting a first alert in response to the first comparison result indicating that the first difference value is larger than the first threshold, the first alert indicating a first possibility that an incident has occurred in the second network;

execute, for each of the plurality of communication apparatuses in the first network, a second estimation process that includes obtaining a second estimation value of the outgoing traffic from the first network to the second network by using the second estimation model with an input of the second measurement value of the incoming traffic from the second network to the first network;

execute, for each of the plurality of communication apparatuses in the first network, a third measurement process that includes obtaining a third measurement value of the outgoing traffic from the first network to the second network during the second time period after the first time period;

execute, for each of the plurality of communication apparatuses in the first network, a second comparison process in response to the first comparison result indicating that the first difference value is less than the first threshold, the second comparison process including outputting a second comparison result by comparing a second difference value with a second threshold, the second difference value being a difference between the second estimation value of the outgoing traffic obtained in the second estimation process and the third measurement value of the outgoing traffic obtained in the third measurement process; and execute, for each of the plurality of communication apparatuses in the first network, a second output process that includes outputting a second alert in response to the second comparison result indicating that the second difference value is larger than the second threshold, the second alert indicating a second possibility that an incident has occurred in the first network, wherein the second output process is configured to, in response to the first comparison result indicating that the first difference value is larger than the first threshold, prevent from the outputting of the second alert based on the second comparison result.

2. The management apparatus according to claim 1, wherein
the processor is further configured to
execute a learning execution process that includes executing learning of the first estimation model and the second estimation model.

3. The management apparatus according to claim 2, wherein
the learning execution process includes learning the first estimation model further based on state information together with the outgoing traffic, the state information indicating a state to which a first period of time corresponds, the first period of time being a period within which the outgoing traffic is measured, the state being one of a working state, a semi-working state, or a closed state,
the first measurement process includes obtaining state information corresponding to a period of time within which the first measurement value of the outgoing traffic is obtained, and
the first comparison process includes using for comparison the first estimation value obtained by inputting the state information to the first estimation model together with the first measurement value of the outgoing traffic.

4. The management apparatus according to claim 2, wherein
the learning execution process includes using, for learning of the first estimation model and the second estimation model, traffic in which a port of a communication apparatus positioned on an edge on topology of the network performs reception or transmission as the outgoing traffic and the incoming traffic.

5. The management apparatus according to claim 1, wherein the first estimation model stored in the memory is configured to output based on the measurement value of the outgoing traffic, the estimation value of the incoming traffic after a given period of time elapses from a time point when the measurement value of the outgoing traffic k measured.

6. A management method, performed by a computer, the method comprising:
accessing a memory configured to store a first estimation model of a first network and a second estimation model of the first network, the first estimation model being configured to output an estimation value of an incoming traffic by using a measurement value of an outgoing traffic as a input data, the second estimation model being configured to output an estimation value of the outgoing traffic by using a measurement value of the incoming traffic as a input data, the incoming traffic indicating a traffic inputted from a second network to the first network, the outgoing traffic indicating a traffic to be outputted from the first network to the second network;
executing, for each of a plurality of communication apparatuses in the first network, a first measurement process that includes obtaining a first measurement value of the outgoing traffic from the first network to the second network during a first time period;
executing, for each of the plurality of communication apparatuses in the first network, a first estimation process that including obtaining a first estimation value of the incoming traffic from the second network to the first network by using the first estimation model with an input of the first measurement value of the outgoing traffic from the first network to the second network;
executing, for each of the plurality of communication apparatuses in the first network, a second measurement process that includes obtaining a second measurement value of the incoming traffic from the second network to the first network during a second time period after the first time period;

executing, for each of the plurality of communication apparatuses in the first network, a first comparison process that includes outputting a first comparison result by comparing a first difference value with a first threshold, the first difference value being a difference between the first estimation value of the incoming traffic obtained in the first estimation process and the second measurement value of the incoming traffic obtained in the second measurement process;

executing, for each of the plurality of communication apparatuses in the first network, a first output process that includes outputting a first alert in response to the first comparison result indicating that the first difference value is larger than the first threshold, the first alert indicating a first possibility that an incident has occurred in the second network;

executing, for each of the plurality of communication apparatuses in the first network, a second estimation process that includes obtaining a second estimation value of the outgoing traffic from the first network to the second network by using the second estimation model with an input of the second measurement value of the incoming traffic from the second network to the first network;

executing, for each of the plurality of communication apparatuses in the first network, a third measurement process that includes obtaining a third measurement value of the outgoing traffic from the first network to the second network during the second time period after the first time period;

executing, for each of the plurality of communication apparatuses in the first network, a second comparison process in response to the first comparison result indicating that the first difference value is less than the first threshold, the second comparison process including outputting a second comparison result by comparing a second difference value with a second threshold, the second difference value being a difference between the second estimation value of the outgoing traffic obtained in the second estimation process and the third measurement value of the outgoing traffic obtained in the third measurement process; and executing, for each of the plurality of communication apparatuses in the first network, a second output process that includes outputting a second alert in response to the second comparison result indicating that the second difference value is larger than the second threshold, the second alert indicating a second possibility that an incident has occurred in the first network, wherein the second output process is configured to, in response to the first comparison result indicating that the first difference value is larger than the first threshold, prevent from the outputting of the second alert based on the second comparison result.

7. A non-transitory computer-readable storage medium for storing a management program, the management program causing a processor to execute a process, the process comprising:

accessing a memory configured to store a first estimation model of a first network and a second estimation model of the first network, the first estimation model being configured to output an estimation value of an incoming traffic by using a measurement value of an outgoing traffic as a input data, the second estimation model being configured to output an estimation value of the outgoing traffic by using a measurement value of the incoming traffic as a input data, the incoming traffic indicating a traffic inputted from a second network to the first network, the outgoing traffic indicating a traffic to be outputted from the first network to the second network;

executing, for each of a plurality of communication apparatuses in the first network, a first measurement process that includes obtaining a first measurement value of the outgoing traffic from the first network to the second network during a first time period;

executing, for each of the plurality of communication apparatuses in the first network, a first estimation process that including obtaining a first estimation value of the incoming traffic from the second network to the first network by using the first estimation model with an input of the first measurement value of the outgoing traffic from the first network to the second network;

executing, for each of the plurality of communication apparatuses in the first network, a second measurement process that includes obtaining a second measurement value of the incoming traffic from the second network to the first network during a second time period after the first time period;

executing, for each of the plurality of communication apparatuses in the first network, a first comparison process that includes outputting a first comparison result by comparing a first difference value with a first threshold, the first difference value being a difference between the first estimation value of the incoming traffic obtained in the first estimation process and the second measurement value of the incoming traffic obtained in the second measurement process;

executing, for each of the plurality of communication apparatuses in the first network, a first output process that includes outputting a first alert in response to the first comparison result indicating that the first difference value is larger than the first threshold, the first alert indicating a first possibility that an incident has occurred in the second network;

executing, for each of the plurality of communication apparatuses in the first network, a second estimation process that includes obtaining a second estimation value of the outgoing traffic from the first network to the second network by using the second estimation model with an input of the second measurement value of the incoming traffic from the second network to the first network;

executing, for each of the plurality of communication apparatuses in the first network, a third measurement process that includes obtaining a third measurement value of the outgoing traffic from the first network to the second network during the second time period after the first time period;

executing, for each of the plurality of communication apparatuses in the first network, a second comparison process in response to the first comparison result indicating that the first difference value is less than the first threshold, the second comparison process including outputting a second comparison result by comparing a second difference value with a second threshold, the second difference value being a difference between the second estimation value of the outgoing traffic obtained in the second estimation process and the third measurement value of the outgoing traffic obtained in the third measurement process; and executing, for each of the plurality of communication apparatuses in the first network, a second output process that includes outputting a second alert in response to the second comparison result indicating that the second difference value is larger than the second threshold, the second alert indicating a second possibility that an incident has occurred in the first network, wherein the second output process is configured to, in response to the first comparison result indicating that the first difference value is larger than the first threshold, prevent from the outputting of the second alert based on the second comparison result.

* * * * *